(12) United States Patent
Thurman et al.

(10) Patent No.: US 9,833,683 B2
(45) Date of Patent: Dec. 5, 2017

(54) GOLF BALL AND CADDIE SYSTEM

(71) Applicant: WILSON SPORTING GOODS CO., Chicago, IL (US)

(72) Inventors: Robert T Thurman, Plainfield, IL (US); Michael Vrska, Mundelein, IL (US); Frank M Simonutti, Wheaton, IL (US)

(73) Assignee: Wilson Sporting Goods Co., Chicago, IL (US)

( * ) Notice: Subject to any disclaimer, the term of this patent is extended or adjusted under 35 U.S.C. 154(b) by 169 days.

(21) Appl. No.: 14/509,234

(22) Filed: Oct. 8, 2014

(65) Prior Publication Data
US 2015/0105173 A1    Apr. 16, 2015

Related U.S. Application Data

(60) Provisional application No. 61/891,487, filed on Oct. 16, 2013.

(51) Int. Cl.
*A63B 71/06* (2006.01)
*G09B 19/00* (2006.01)
*A63B 24/00* (2006.01)

(52) U.S. Cl.
CPC .......... *A63B 71/06* (2013.01); *G09B 19/0038* (2013.01); *A63B 2024/0056* (2013.01)

(58) Field of Classification Search
CPC ........ G09B 19/0038; A63B 2024/0056; A63B 71/06
See application file for complete search history.

(56) References Cited

U.S. PATENT DOCUMENTS

| | | | |
|---|---|---|---|
| 5,820,484 A | 10/1998 | Terry | |
| 5,873,797 A | 2/1999 | Garn | |
| 6,073,086 A | 6/2000 | Marinelli | |
| 6,148,271 A | 11/2000 | Marinelli | |
| 6,151,563 A | 11/2000 | Marinelli | |
| 6,157,898 A | 12/2000 | Marinelli | |
| 6,767,282 B2 | 7/2004 | Matsuyama et al. | |
| 8,070,620 B2 | 12/2011 | Rankin | |
| 8,725,452 B2 | 5/2014 | Han | |
| 8,781,610 B2 | 7/2014 | Han | |
| 8,989,441 B2 | 3/2015 | Han et al. | |
| 2005/0101415 A1* | 5/2005 | Sweeney | A63B 24/0021 473/407 |
| 2005/0227791 A1 | 10/2005 | McCreary et al. | |
| 2005/0266935 A1* | 12/2005 | Mabry | A63B 69/3691 473/409 |
| 2009/0040761 A1 | 2/2009 | Huang et al. | |
| 2009/0062033 A1 | 3/2009 | Harada | |

(Continued)

FOREIGN PATENT DOCUMENTS

WO    WO2005089890 A1    9/2005

*Primary Examiner* — Gene Kim
*Assistant Examiner* — Jeffrey Vanderveen
(74) *Attorney, Agent, or Firm* — Terence P. O'Brien; Todd A. Rathe

(57) ABSTRACT

An apparatus including a golf ball comprising an internal sensor, and an internal wireless communicator. The internal wireless communicator adapted to communicate parameters sensed by the sensor to external electronics, wherein the external electronics are configured to determine if the golf ball went into a cup based upon the parameters.

29 Claims, 9 Drawing Sheets

(56) References Cited

U.S. PATENT DOCUMENTS

| | | | |
|---|---|---|---|
| 2009/0209358 A1* | 8/2009 | Niegowski | A43B 3/0005 473/223 |
| 2011/0076657 A1* | 3/2011 | Forest | G06Q 10/10 434/252 |
| 2012/0029666 A1 | 2/2012 | Crowley et al. | |
| 2012/0169589 A1 | 7/2012 | Albano et al. | |
| 2012/0244969 A1 | 9/2012 | Binder | |
| 2012/0277890 A1 | 11/2012 | Han | |
| 2013/0085018 A1* | 4/2013 | Jensen | A63F 13/812 473/404 |
| 2013/0172093 A1* | 7/2013 | Leech | A63B 57/00 473/152 |
| 2014/0120960 A1 | 5/2014 | Hohteri | |
| 2014/0128182 A1 | 5/2014 | Hohteri | |
| 2015/0072811 A1* | 3/2015 | Jolliffe | G09B 19/0038 473/570 |

* cited by examiner

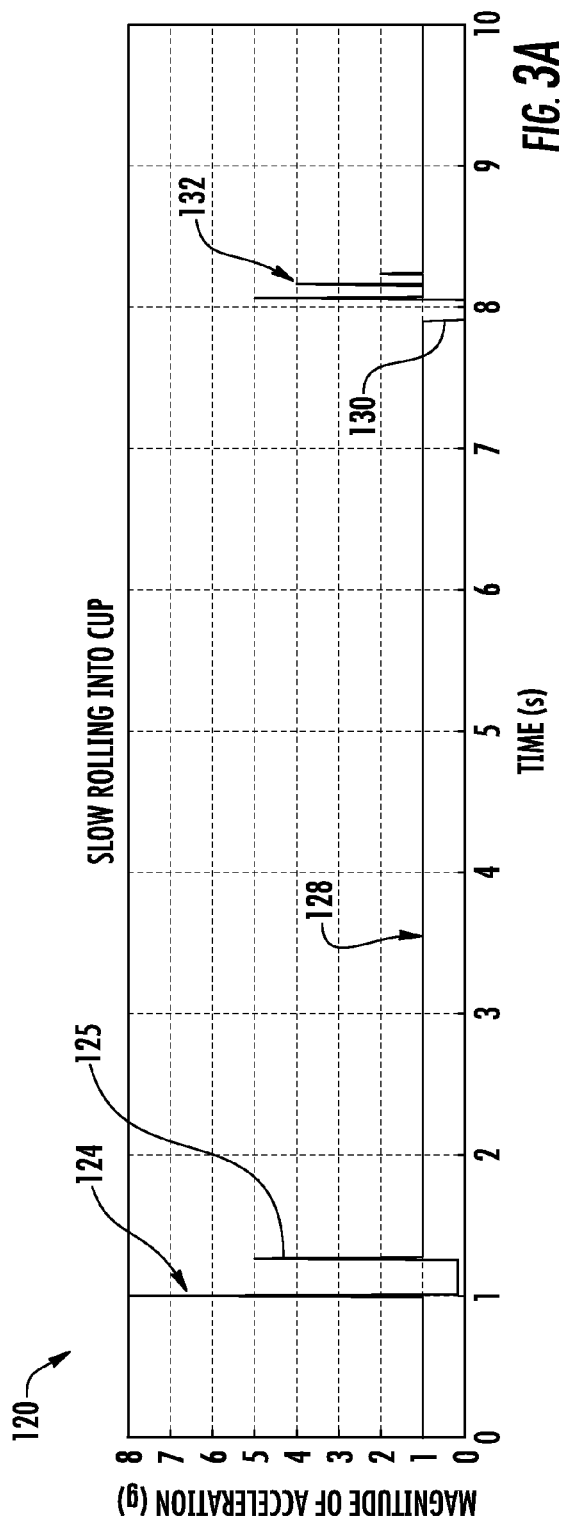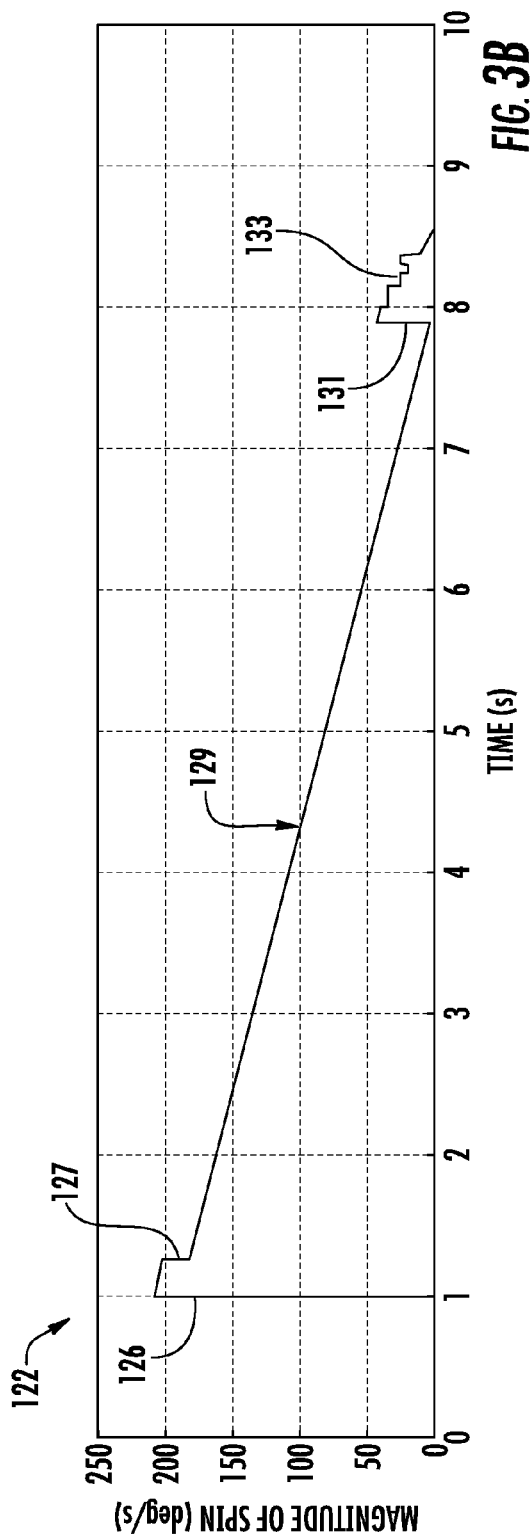

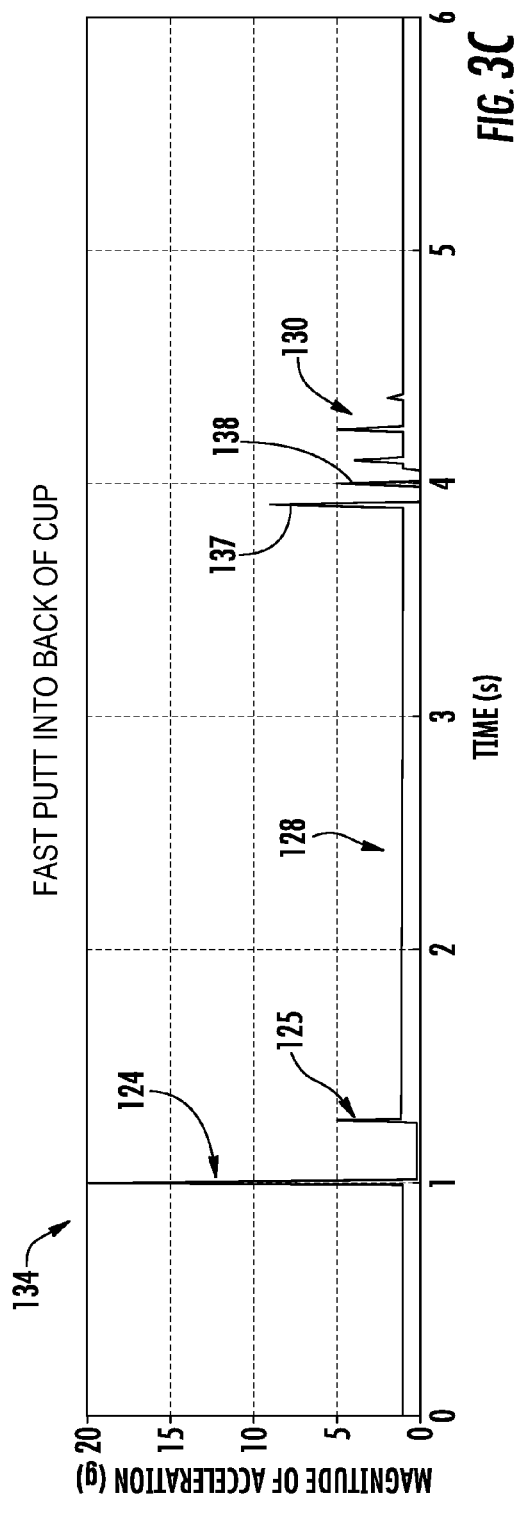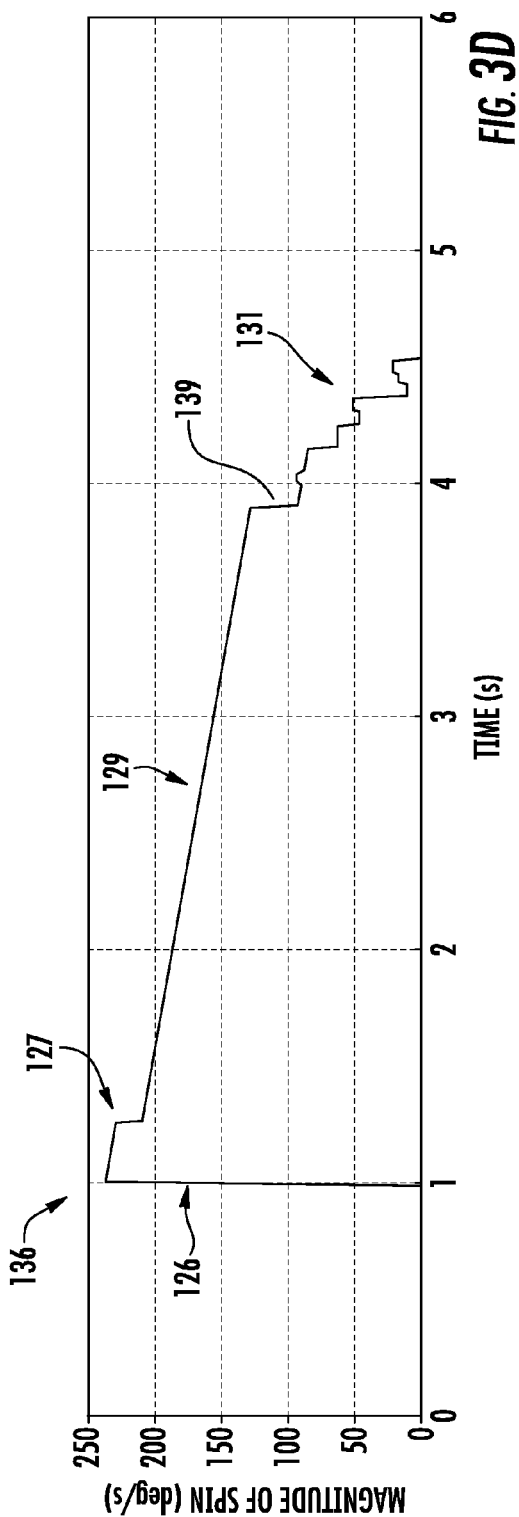

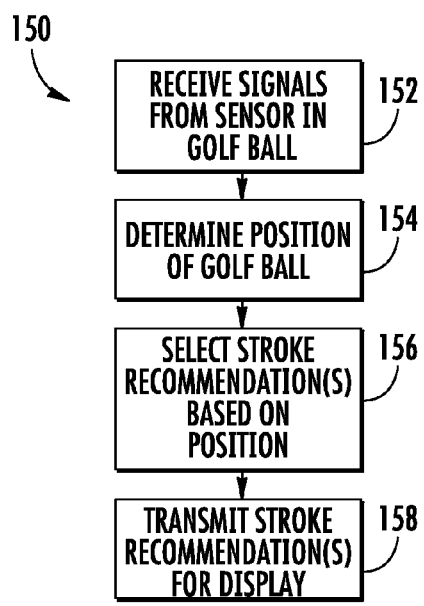
FIG. 5
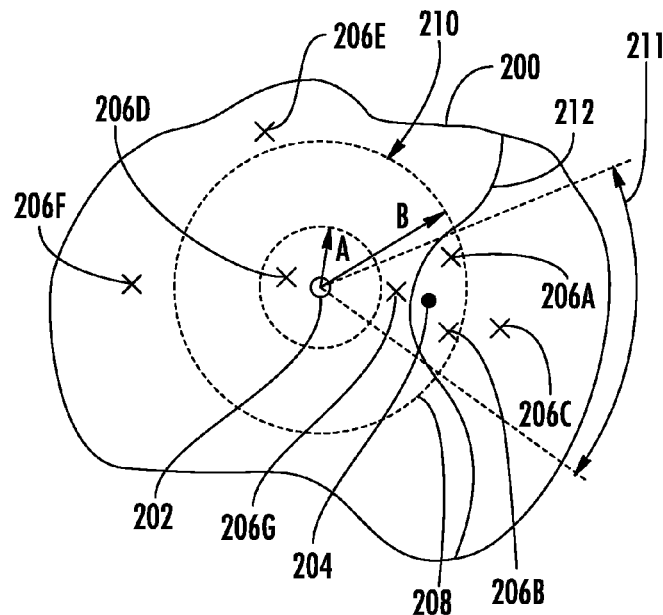
FIG. 6
FIG. 7
| POS. | HOLE LOCATION 202 | | | |
|---|---|---|---|---|
| | FORCE | VECTOR | SPIN | G.S. |
| 206A | ... | ... | ... | ... |
| 206B | ... | ... | ... | ... |
| 206C | ... | ... | ... | ... |
| 206D | ... | ... | ... | ... |
| 206E | ... | ... | ... | ... |
| 206F | ... | ... | ... | ... |
| 206G | ... | ... | ... | ... |
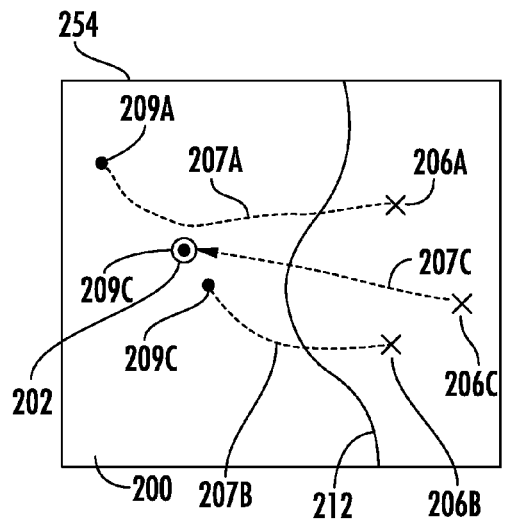
FIG. 8
FIG. 9
| AVAILABLE STROKE DATABASE | | |
|---|---|---|
| GENERAL POPULATION | $ | ○ |
| LOCAL GOLF INSTRUCTOR | $$ | ○ |
| PROFESSIONAL GOLFER | $$$ | ○ |
| JOE SMITH | $$ | ○ |
| PADRAIG HARRINGTON | $$ | ○ |
| MY DATABASE | $$ | ○ |
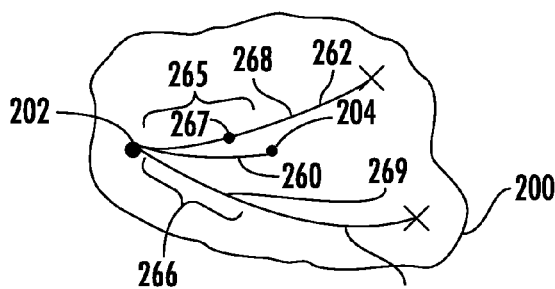
FIG. 8A

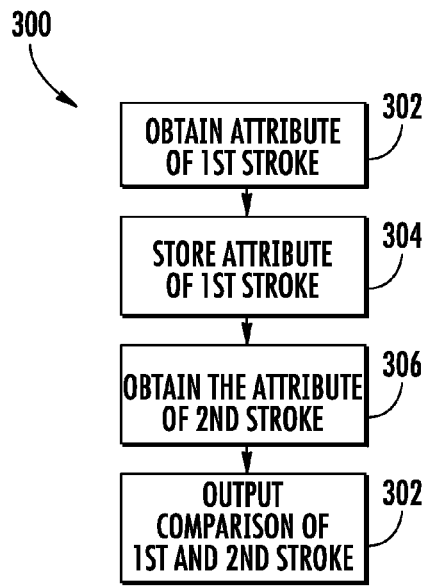
FIG. 10
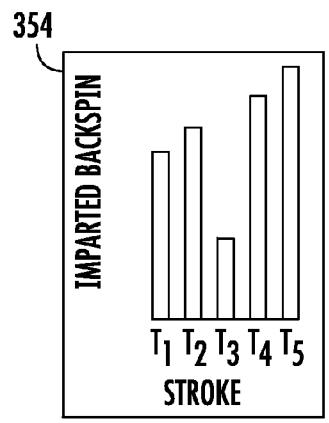
FIG. 11
FIG. 12
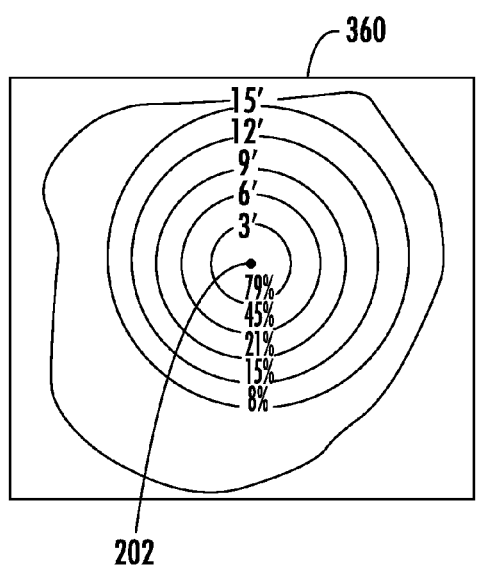
FIG. 13
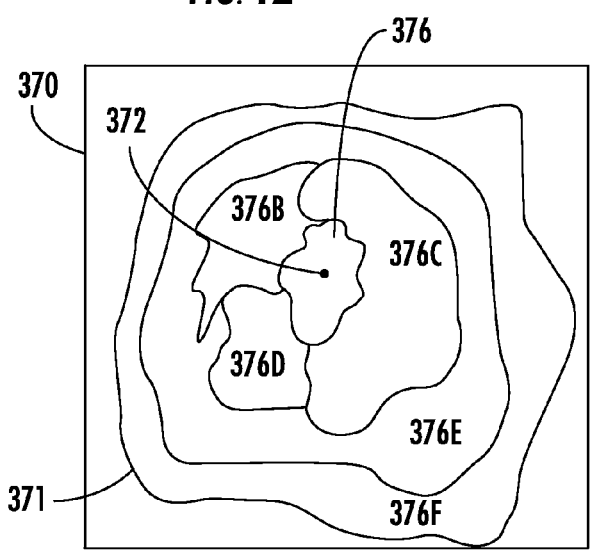
FIG. 14

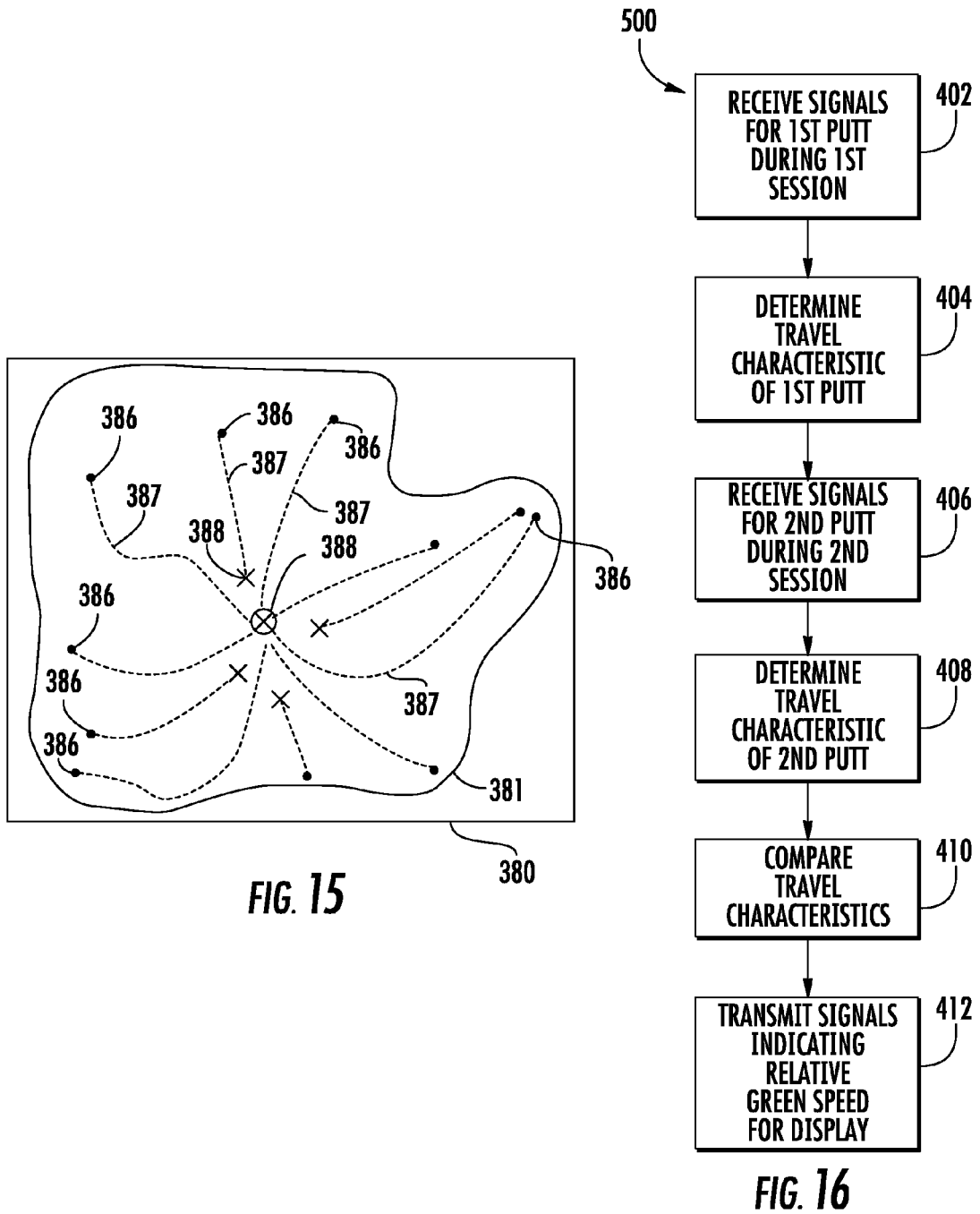

GOLF BALL AND CADDIE SYSTEM

RELATED APPLICATION DATA

The present application claims priority to U.S. Provisional Patent Application Ser. No. 61/891,487 entitled GOLF BALL AND CADDIE SYSTEM filed on Oct. 16, 2013, which is hereby incorporated by reference in its entirety. The present application is related to co-pending U.S. patent application Ser. No. 14/509,167 filed on the same day herewith, the full disclosure of which is hereby incorporated by reference.

BRIEF DESCRIPTION OF THE DRAWINGS

FIG. 3A is a diagram of an example signature acceleration trace for a putt resulting in a golf ball rolling directly into a cup.

FIG. 3B is a diagram of an example signature spin velocity trace for the part of FIG. 3A.

FIG. 3C is a diagram of an example signature acceleration trace for a made putt resulting in a golf ball impacting a rear wall of the cup.

FIG. 3D is a diagram of an example signature spin velocity trace for the putt of FIG. 3A.

FIG. 5 is a flowchart illustrating an example of a stroke guidance method of the caddie system.

FIG. 6 illustrates an example display of a stroke guidance mode illustrating start and finish positions and paths of travel of struck golf balls.

FIG. 7 is an example display of the results of the stroke guidance display of FIG. 6.

FIG. 8 is an example display illustrating recommended strokes based upon previous golf ball stroke paths.

FIG. 8A is an example of a display illustrating a processor generating a new recommended stroke of a current golf ball position to a golf hole.

FIG. 9 illustrates a display of multiple available databases of previously recorded shots from different sources.

FIG. 10 is a flowchart illustrating an example stroke analysis method carried out by the caddie system.

FIG. 11 is a display of an example output of the stroke analysis method of the caddie system illustrating multiple recorded strokes and various attributes of such strokes.

FIG. 12 is a display of another example output of the stroke analysis method that includes a bar graph.

FIGS. 13 and 14 illustrate example displays to enable a golfer to visually evaluate his or her progress and identify areas of improvement.

FIG. 15 is a display illustrating an example output of recorded golf strokes from the caddie system.

FIG. 16 is a flowchart illustrating an example stroke analysis method of the caddie system.

DETAILED DESCRIPTION OF THE EXAMPLE EMBODIMENTS

Figure 1:
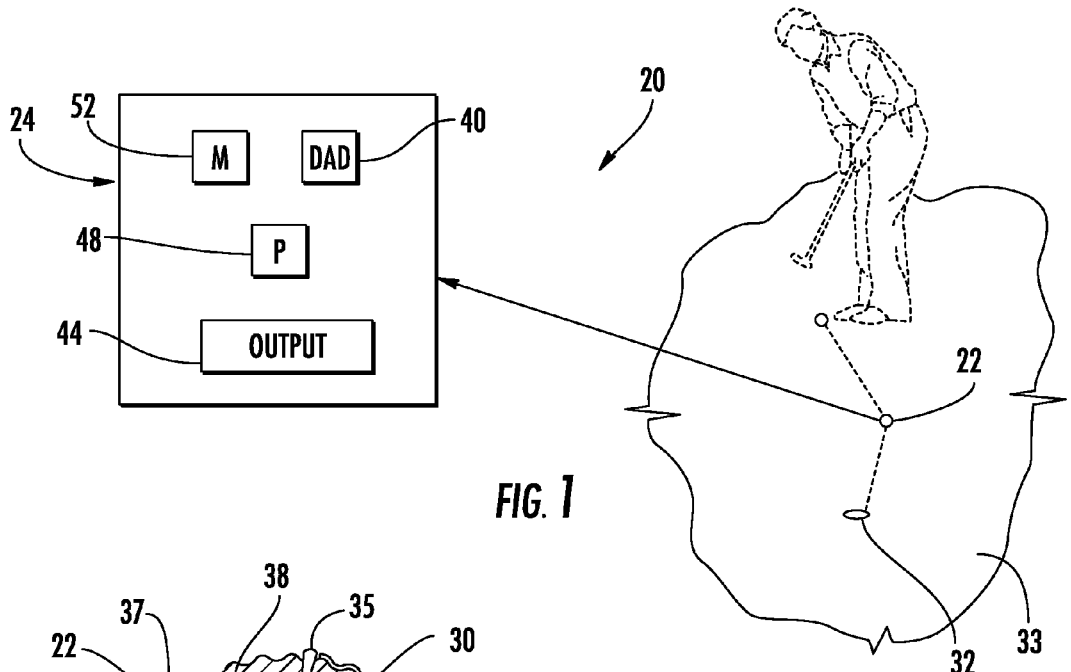
FIG. 1 illustrates an example golf ball sensing or caddie system in accordance with one implementation of the present invention.

FIG. 1 illustrates an example golf ball sensing or caddie system 20. Golf ball caddie system 20 senses attributes or parameters of a golf ball 22 during and after impact with a golf club, such as a putter, and/or the travel of the golf ball 22. Caddie system 20 can utilize such attributes to advise the golfer on a number of items or conditions relating to the attributes. Examples of such items or conditions can include one or more of the following items or conditions: the age of the golf ball being used; the performance status of the golf ball being used; whether or not the golf ball should be replaced with a newer golf ball; the speed of the green as compared to prior golf outings; the speed of the ball over time following impact; the spin of the ball over time following impact, the spin axis of the ball following impact; the distance traveled by the ball following impact; and whether the golf ball ended up in a cup or hole 32. Caddie system 20 utilizes such attributes to track performance and improvement of the golfer, to automatically score a golf hole and/or to recommend or facilitate the identification of adjustments to improve the golfer's golf score. In one implementation, caddie system 20 additionally or alternatively facilitates golf club fitting and analysis.

Figure 2:
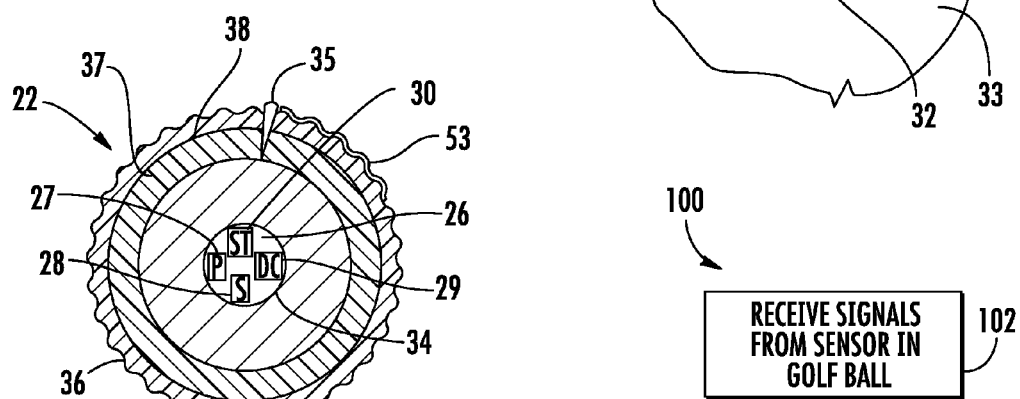
FIG. 2 is a cross-sectional view illustrating an example golf ball 22.

Golf ball caddie system 20 comprises golf ball 22 and a portable electronic device 24. FIG. 2 is a sectional view illustrating an example golf ball 22. Golf ball 22 carries at least one electronics package 26 which comprises a power source 27, at least one sensor 28, a data compression component 29 and at least one signal transmitter 30 (each of which is schematically shown).

Power source 27 supplies power to power consuming components of electronics package 26. In one implementation, power source 27 comprises an embedded battery. In one implementation, power source 27 comprises a rechargeable battery, wherein golf ball 22 includes a recharging port by which the batteries are recharged through a wire or plug. In such implementations, the recharging port includes a flap or other protective cover. In other implementations, power source 27 comprises a rechargeable battery and an internal wireless battery charging device. For example, power source 27 may comprise a battery and a device for inductively charging the internal battery of golf ball 22. In yet other implementations, golf ball 22 may include an internal recharging device comprising a movable magnet and coils by which movement of golf ball 22 when being struck generates energy for recharging the internal battery. In yet other implementations, power source 27 may comprise a battery that is not rechargeable.

The at least one sensor 28 (referred to as sensor 28) senses various attributes of a stroke of a golf ball towards a cup or hole 32. Although FIG. 1 illustrates ball 22 during a stroke comprising a putt of ball 22 on the surface of a green 33 using a putter, in other circumstances, golf ball caddie system 20 may additionally or alternatively be configured to sense attributes of a stroke comprising a full swing or partial swing of a driver, a wood, a hybrid, an iron, and/or a wedge golf club of the golf ball 22 from a surface off of or remote from the green 33. Such swings can include a swing, chip or pitch from a fairway, from off a fringe of the green, from in a sand trap, from the rough, from a tee box, and/or from a practice surface. In one implementation, sensor 28 senses one or more attributes of a stroke such as travel or linear acceleration, spin axis, spin rate, launch direction, launch angle, launch coordinates, vibration and the like. In one implementation, sensor 28 senses, and signal transmitter 30 outputs, values for attributes of a stroke over time, indicating how the attribute is changing over time as a stroke progresses through its lifecycle from the initial launch. For purposes of this disclosure, the term "raw sensed data" or "raw sensed motion data" means data signals or data values directly generated by sensor 28 with respect to motion of golf ball 22, the positioning of golf ball 22 or impact/vibrations experienced by golf ball 22. The terms "raw sensed data" and "raw sensed motion data" encompass both compressed and uncompressed data values. The term "attribute of a stroke" encompasses both raw sensed data and data or characteristics that have been derived from the raw sensed data. In one implementation, sensor 28 comprises one or more accelerometers to detect motion such as acceleration and velocity. In one implementation, sensor 28 additionally or alternatively comprises one or more gyrometers to sense spin axis and spin rate. One implementation, sensor 28 additionally or alternatively comprises a magnetometer, a GPS sensor and/or other device to facilitate position detection of golf ball 22. In yet other implementations, sensor 28 may comprise other sensing technologies. The sensor 28 can include one or more of the following sensors: an accelerometer, a gyrometer, a magnetometer, a load cell, a temperature sensor, a moisture sensor, a barometer, a gps sensor, an optical sensor, and combinations thereof.

Data compression component 29 comprises a device carried by golf ball 22 for compression of data representing the sensed attributes of the stroke. As a result, signal transmitter 30 more quickly and efficiently transmits larger amounts of data regarding attributes of the stroke. In other implementations, data compression component 29 may be omitted.

Signal transmitter 30 transmits or outputs the sensed attributes of the stroke to portable electronic device 24. Signal transmitter 30 comprises one or more devices to externally communicate the motion information or motion data sensed by sensor 28. In one implementation, signal transmitter 30 comprises a device to wirelessly transmit signals representing the sensed motion information. For example, in one implementation, signal transmitter 30 comprises a Bluetooth device. In another implementation, signal transmitter 30 comprises a Wi-Fi or other radiofrequency transmitter. In another implementation, signal transmitter 30 comprises an active read/write RFID tag which is written upon with data sensed by sensor 28, wherein signal transmitter 30 actively transmits signals from the tag. In yet another implementation, signal transmitter 30 comprises a passive read/write RFID tag which is written upon with data sent by sensor 28, wherein signal transmitter 30 is passively read by an external radiofrequency device reader. In another implementation, signal transmitter 30 comprises an infrared or other optical communication device. In yet other implementations, signal transmitter 30 may comprise other devices that communicate the sensed motion data to recipients external to golf ball 22 in a wireless fashion.

In one implementation, electronics 26 carries out at least some data modifications and/or analysis prior to the data being externally transmitted to the portable electronic device 24. For example, electronics 26 may carry out some analysis or data derivations on the raw sensed motion information or on derived results of the raw sensed motion information prior to transmitting the modified, derived and/or compressed data to the portable electronic device before. For example, in some implementations, electronics 26 may itself analyze the raw sensed motion data to determine whether a particular stroke was a made stroke or a missed stroke, wherein this determination is transmitted to portable electronic device 24 for tracking and further analysis. In other implementations, electronics 26 may transmit, in real time, raw signal data or raw sensed data directly from sensor 28 to the portable electronic device, wherein the portable electronic device performs analysis or further data derivation using the raw sensed motion data. In such an implementation, because the processing power is more greatly provided by the portable electronic device 24, rather than electronics 26 of golf ball 22, the cost of golf ball 22 may be kept low.

In the example illustrated, electronics or electronics package 26 comprises a circuit board secured and held within a hollow interior 34 of golf ball 22. In another implementation, electronics package 26 comprises individual electronic components embedded, fastened or otherwise secured within the hollow interior 34. In another implementation, the electronics package 26 can be formed in a potting compound. The potting compound can comprise a mass of solid compound at least substantially encapsulating, if not completely encapsulating, the electronics. For purposes of this disclosure, the term "encapsulate" or "encapsulating" refers to a body or mass of material that contacts and closely conforms to the shape of the item being encapsulated which occurs as a result of the mass of material by being applied to the item being encapsulated while in a liquid, amorphous or gelatinous form, where the mass subsequently solidifies while about and against the item being encapsulated. The term "substantially encapsulate" or "substantially encapsulating" refers to the mass of material about and in close conformal contact with at least three sides of the item being encapsulated. The term "completely encapsulate" or "completely encapsulating" refers to the mass of material surrounding and enclosing on all sides the item being encapsulated.

In one implementation, potting compound of the package 26 comprises a solidified mass of previously amorphous, gelatinous or liquid material. In one implementation, potting compound comprises a polyurethane, silicone or other solidified polymer. In one implementation, potting compound comprises a thermosetting plastic or silicone rubber gel. In another implementation, the potting compound can be formed of an epoxy, acrylonitrile butadiene styrene (ABS), or other thermoplastic material. In one implementation, potting compound comprises a low glass transition temperature potting compound to inhibit breakage of solder bonds during solidification.

Potting compound, when solidified or hardened, forms an encapsulating body encapsulating electronics. Encapsulating body is sized and shaped to fit within hollow interior 34 of golf ball 22. In the example illustrated, encapsulating body has an outer profile or shape that substantially matches the outer profile or shape of hollow interior 34 defined by hollow core 35 of golf ball 22 so as to restrict or limit movement of body within hollow interior 34. In the example illustrated in which hollow interior 34 is spherical, and the package 26 is also spherical. In other implementations, encapsulating body of the package 26 may have other shapes when hollow interior 34 also has the same other corresponding shapes. For example, in one implementation, rather than comprising a sphere, hollow interior 34 may alternatively comprise a cylinder or other three dimensional shape. In still other implementations, encapsulating body of the package 26 can have other shapes or configurations, not necessarily matching the shape of hollow interior 34. In yet other implementations, an external service of encapsulating body of package 26 may have one or more projections or detents, wherein the internal surface of hollow interior 34 one or more other corresponding projections or detents to secure the package 26 within the ball.

In the example illustrated, ball 22 comprises a thermoplastic golf ball having a hollow core 35 and an outer cover layer 36. Hollow core 35 is formed by solid thermoplastic material formed from a terpolymer of ethylene, acrylic acid and n-butyl acrylate, wherein 100% of the acid groups are neutralized with a metal ion. In the example illustrated, the hollow core contains sensor 28 and signal transmitter (communicator) 30. The hollow core has an inner diameter from 0.25 to 1 inch and an outer diameter from 1.0 to 1.375 inches. The terpolymer of 100% percent neutralized acid has a specific gravity within the range of 0.95 to 2.5. The specific gravity of the terpolymer can be obtained through compounding the terpolymer with an inert filler. In one implementation, the inert filler is selected from a group of fillers consisting of a metallic filler (such as copper, steel, tungsten) or an inorganic compound (such as barium sulfate, zinc oxide), and having a specific gravity within the range of 4 to 19. In the example illustrated, the hollow interior hollow portion 34 is substantially free of liquid or pressurized gas.

In the example illustrated, the mantle is formed of a single mantle layer 37. Mantle layer 37 comprises ethylene/acrylic acid/n-butyl acrylate with 100% of the acid groups being neutralized with magnesium ions. Mantle layer 37 is free of inert filler and is a specific gravity of 0.92 to 0.96. In another implementation, the mantle layer 37 can be formed of two mantle layers (first mantle layer 37 and a second mantle layer 38). The second mantle layer 38 comprises an ionomer comprising a copolymer or ethylene and (meth)acrylic acid or a terpolymer of ethylene/(meth)acrylic acid and n-butyl acrylate, a mixture thereof, or a 100% neutralized terpolymer of ethylene/acrylic acid and n-butyl acrylate. Mantle layer 38 omits inert filler and has a specific gravity of less than 0.99.

Cover layer 36 comprises a layer of at least one thermoplastic material selected from the group consisting of ionomers, ethylene copolymers, thermoplastic elastomers, thermoplastic polyurethanes, thermoset polyurethanes and/or mixtures thereof. The outer cover layer 36 has a Shore D hardness of from 40 to 70 Shore D. In one implementation, an example construction of golf ball 22 provides an increased moment of inertia resulting in an increased spin rate over a comparable ball having comparable ball compression values and a comparable cover hardness. In other implementations, the construction of the golf ball may result in no or a minimal increase in the moment of inertia of the ball. At the same time, golf ball 22 provides a hollow interior 34 for the reception of electronics 26. In other implementations, golf ball 22 may have other configurations while containing electronics 26. For example, in other implementations, electronics 26 may alternatively be embedded or molded into a polybutadiene or thermoplastic core of a golf ball 22 with or without a hollow interior. In one implementation, electronics 26 are secured and located within golf ball 22 at locations and distributions so as to minimize any impact of the presence electronics 26 on the roll, flight or other travel of golf ball 22.

In one implementation, the golf ball has a compression value within the range of 30 to 100. Compression for golf ball cores is calculated using the following formula: Comp.=160−0.8(1000×Deflection). Deflection measurements were taken under a 200 lb. applied load, using an ADC Compression testing machine. In another implementation, the golf ball has a compression value within the range of 50 to 90.

As will be described hereafter with respect to other figures, in some implementations, signal transmitter 30 may additionally or alternatively communicate sensed or determined information in other fashions. For example, in one implementation, signal transmitter 30 comprises a plug-in or port by which the sensed motion data may be communicated externally from golf ball 22 in a wired fashion. In another implementation, signal transmitter 30 may additionally or alternatively include one or more output mechanisms carried by golf ball 22 for visually and/or audibly communicating information to a person. For example, in one implementation, signal transmitter 30 comprises a visual display, such as a digital or light emitting diode (LED) display visibly presenting sensed motion information. In another implementation, signal transmitter 30 comprises a speaker for producing audible signals communicating the sensed motion information. In yet another implementation, signal transmitter 30 comprises a light emitter that emits light that is visible on golf ball 22, wherein the light being emitted changes in response to or based upon the sensed motion information.

Portable electronic device 24 comprises a device configured to receive signals outputted from signal transmitter 30 of sensor 26 of golf ball 22 and to visibly present information based upon attributes of the sensed stroke of the golf ball (attributes of the struck and moving golf ball). Examples of portable electronic device 24 include, but are not limited to, a smart phone, a flash memory reader (IPOD), a cell phone, a personal data assistant, a laptop computer, a tablet computer, a netbook computer and the like. In one implementation, portable electronic device 24 may be configured similar to or provided as part of a wristwatch, wrist-top computer, or wristband, permitting a player or user to view his or her track results (or the results of a competitor in some implementations) while on the golf course in real time. In yet another implementation, portable electronic device 24 may be configured similar to or provided as part of a pair of glasses or other eyewear, permitting a player or user to view or track his or her results (or the results of a competitor in some implementations) while on the golf course in real time.

As schematically shown in FIG. 1, in one implementation, portable electronic device 24 comprises data acquisition device 40, output 44, processing unit 48 and memory 52. Data acquisition device 40 comprises a device to obtain at least one attribute of a stroke of the golf ball towards cup 32, wherein the at least one attribute is sensed by sensor 28 or derived from signal output by sensor 28. In one implementation, data acquisition device 40 obtains raw sensed data directly from signal transmitter 30 of electronics 26 of golf ball 22. In another implementation, data acquisition device 40 obtains information derived from raw sensed data from electronics 26. In the example illustrated, data acquisition device 40 cooperates with signal transmitter 30 to directly receive attributes of a stroke from electronics 26. In another implementation, signal transmitter 30 of electronics 26 may transmit sensed attributes of a stroke to an intermediary, such as to a cloud server or other server on a network, wherein data acquisition device 40 obtains at least one attribute of a stroke of golf ball 22 from the intermediary.

As shown by FIG. 1, in the example illustrated, data acquisition device 40 obtains various attributes of a stroke directly or indirectly from electronics 26 of golf ball 22. Examples of such attributes of a stroke comprise stroke launch information such as the launch coordinates LCOOR, launch direction LD and launch angle LA (in circumstances where the golf ball 22 is elevated off of the underlying surface during a stroke). Launch coordinates refers to the initial location of golf ball 22 with respect to hole 32 from which a golf ball stroke is launched or struck. Launch coordinates includes both the linear distance from a stroke launch position to hole 32 and the relative angular positioning of the stroke launch with respect to hole 32.

The launch coordinates LCOOR is based upon a predetermined or pre-calibrated coordinate system defining the position of hole 32. In one implementation, the coordinate system is established using portable electronic device 24. In another implementation, the coordinate system is pre-established by other electronic devices and retrieved from storage either locally or remotely. In one implementation, portable electronic device 24 provides a person with the option to select which of various modes or methods may be utilized to establish a locational grid or coordinate system for subsequently identifying, using one or more sensors 28 of golf ball 22, where a stroke is launched from with respect to hole 32. In other implementations, the user may be provided with one or less than all of the below described methods for establishing a coordinate system.

According to one selectable mode of operation, the coordinate system is established by employing a magnetometer (one of sensors 28) in golf ball 22. In such an implementation, the user is prompted to calibrate and establish a baseline for an earth compass direction of the golf hole 32. In particular, the user is provided with an output 44 by processor 48 following instructions in memory 52 or is otherwise instructed to roll the ball in a direction perpendicular to the goal from a known location. The magnetometer (sensor 28), using the earth compass, determines and utilizes this known line of stroke as a reference to establish a coordinate system for later use in identifying launch coordinates for a stroke. The coordinate system or the known line of stroke is stored in memory 52 or a remote memory such that no further calibration is needed the next shooting session.

According to another selectable mode of operation, the hole coordinate system is established using an RSS timestamp between sensor 28 in golf ball 22 and a remote computing device located at a known a predetermined location relative to hole 32. In one implementation, such remote computing devices may comprise a portable electronic device such as a cell phone, a smart phone, a laptop, a tablet and the like. Using an RSS timestamp between sensor 28 and computing device, trigonometry is employed to determine the current position of the golf ball and to establish a coordinate system for hole 32 and the green. The established coordinate system is stored for subsequent use to identify launch coordinates.

According to another selectable mode of operation, the hole coordinate system is established using signals from a global positioning system or GPS technology. In particular, signals from a GPS system that were acquired through a GPS sensor (one of sensors 28) within golf ball 22 at a known location with respect to hole 32 are used to establish a coordinate system for hole 32 and the playing surface for subsequent use in identifying launch coordinates. In one implementation, the location of the hole is determined based upon a GPS location of the hole or flag or signal emitting device secured to the flag.

According to another selectable mode of operation, the hole coordinate system is established using a localized positioning system utilizing antennas located on or near the green at one or more known locations with respect to hole 32. During calibration, the antennas communicate with sensors 28 and employ trigonometry to determine the current location of the golf ball 22 and establish a coordinate system for the hole 32 and the playing surface for subsequent use in identifying launch coordinates. In one implementation, such antennas may be provided by a portable electronic device such as a cell phone, a smart phone, a laptop, a tablet and the like.

According to yet another selectable mode of operation, the hole coordinate system is established using a localized magnetic field in the green and a known location of the golf ball 22 utilizing sensor 28 in golf ball 22 to determine a current location of the golf ball with respect to hole 32 to establish a coordinate system of the hole and green.

For purposes of this disclosure, the term "cup" and "hole" are used interchangeably. In some implementations a "cup" or "hole" comprises a simulated cup. In other implementations, a "cup" comprises a real world hole in a real world green. In some implementations, a "cup" comprises a portable golf ball target receptacle, such as a golf ball putter practice cup. In some implementations, a "cup" comprises a hole having a United States Golfing Association (USGA) regulation diameter of 4.25 inches. In other implementations, a "cup" comprises a hole having smaller or larger dimensions. For example, in one implementation, a "cup" may comprise an enlarged hole, such as a hole having a diameter of 15 inches.

In each of the above described modes of operation where sensors 28 of golf ball 22 are used in the establishment of a coordinate system, corresponding sensors of a portable electronic device, such as portable electronic device 24, may alternatively be utilized in place of the sensors 28. For example, in one implementation, instead of locating golf ball 22 at a known location with respect to hole 32 and using the above-described RSS timestamp triangulation or the above-described antenna triangulation, corresponding sensors of a portable electronic device may alternatively be located at the known location, wherein the established coordinate system is subsequently transmitted from the portable electronic device to golf ball 22, where it is stored for subsequent use when transmitting launch coordinates.

In some implementations, such as where golf stroke results are being recorded, the initial location (launch coordinates) of golf ball 22 may not be precisely known prior to a stroke. For example, GPS signals may not be available and the exact distance to the hole may not be known prior to a stroke. In such implementations, the launch coordinates may be in terms of a relative position of the golf ball to the hole 32. In one implementation, the launch coordinates for each of various strokes of the golf ball leading to a completed hole may be determined after the ball is been struck one or more times and has ended up in the cup as detected by electronics 26 and portable electronic device 24. For example, portable electronic device 24, using signals from electronics 26 (such as acceleration, vibration and the like) may determine that the hole has been completed with the ball falling into the cup. Based upon previous restored attributes of golf ball 22 (the acceleration, travel distance and the like of the golf ball prior to falling into the cup, portable electronic device 24 may determine the relative location of the beginning of each stroke to the hole, wherein the relative locations of the initial locations relative to the hole for each stroke are stored in memory 52 or a remote memory for subsequent analysis and presentation. If a player three putts a particular green prior to completing the hole, once a hole is been completed, portable electronic device 24 calculates the initial location of each of the three putts relative to the hole based upon stored parameters determined from signals received from electronics 26 and stores such initial locations.

Launch direction LD refers to the horizontal angular direction of a golf ball stroke. In one implementation, golf ball 22 additionally comprises visible indicia 53 to assist in launch directions for putting directional guidance and training. Visible indicia 53 identify a localized ball coordinate system and sensor axes of electronics 26. In another implementation, visible indicia 53 are configured to be calibrated to the localized ball coordinate system and sensor axes of electronics 26. As a result, visible indicia 53 either instructs a golfer as to what direction to putt ball 22 or an appropriate putting line. Visible indicia 52 may further by the ability measure off-line a direction of putt if the initial location or the final locations is not known for creating a target line. In one implementation, visible indicia 53 comprises an external marking (shown as having an exaggerated thickness in FIG. 2 for purposes of illustration), such as a line, arrow, series of dots and the like. In yet another implementation, indicia 53 may be embedded within ball 22, but visible through transparent portions of ball 22. In other implementations, indicia 53 may be omitted. Launch angle LA refers to the inclination or vertical angular direction of the golf ball after being struck.

Such attributes of a stroke further comprise flight or motion information of golf ball 22. Examples of such attributes comprise acceleration over time A(t), velocity over time V(t), spin axis SA, spin rate SR and the general path of golf ball 22 such as its maximum height or peak P. Acceleration over time and velocity over time are determined from signals from accelerometers of sensor 28. Spin axis and spin rate of golf ball 22 are driven from signals from one or more gyrometers of sensor 28 which detect the spin S(t) of golf ball 22 over time. Each of acceleration over time, velocity over time, spin axis and spin rate are sensed and output as a function of time throughout the life of a stroke from launch through a make or miss determination. In other implementations, one or more of acceleration over time, velocity over time, spin axis and spin rate are merely sensed or detected at launch of a stroke or at another point in time of a stroke, wherein the attributes of the stroke at other times during the stroke are estimated from the one or more sensed attributes or values. In one implementation, each of such attributes is defined along three coordinates X, Y and Z coordinates.

Such attributes of a stroke may further comprise impact information with respect to golf ball 22. Examples of such impact information comprise vibration VBB of golf ball 22 as it is being struck by a golf club and one or more vibrations VR of golf ball 22 as it impacts the flag or a bottom of the cup. Such impacts may be detected by pressure sensor or may be detected by signals from accelerometers and/or gyrometers of sensor 28.

Output 44 comprises one or more devices to present information to a person. Such information can be based on the determination of whether a stroke is a made hole or based upon the determination of which of multiple strokes are made holes or missed holes. In one implementation, output 44 comprises a display screen. In other implementations, output 44 may additionally or alternatively comprise a speaker. In the example illustrated, output 44 is part of portable electronic device 24. In other implementations, output 44 may alternatively be provided on a more stationary computing device, such as a desktop computer or monitor, or may be incorporated into golf ball 22.

Processing unit 48 comprises one or more processors configured to carry out operations in accordance with instructions contained in memory 52. For purposes of this application, the term "processing unit" shall mean a presently developed or future developed processing unit that executes sequences of instructions contained in a memory. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. For example, in some implementations, at least portions of processing unit 48 and memory 52 may be embodied as part of one or more application-specific integrated circuits (ASICs). Unless otherwise specifically noted, operations described as being carried out by processor 48 and memory 52 are not limited to any specific combination of hardware circuitry and software, nor to any particular source for the instructions executed by the processing unit.

Memory 52 comprises a non-transient or non-transitory computer-readable medium or persistent storage device. In the example illustrated, memory 52 stores software, code or computer-readable instructions for directing processor 48 to carry out one or more operations utilizing the one or more attributes of a stroke obtained by data acquisition device 40. The instructions in memory 52 further direct processor 48 in the presentation of make/miss results and/or analysis (statistical analysis and recommendations) on output 44. In the example illustrated, memory 52 further stores the results as well as various settings, data tables and thresholds employed in the acquisition of stroke attributes, the analysis of stroke attributes and the output of results.

In operation, caddie system 20 is operable in one or more of the following modes: stroke tracking; stroke guidance; and stroke analysis.

Stroke Tracking Mode

Figure 3:
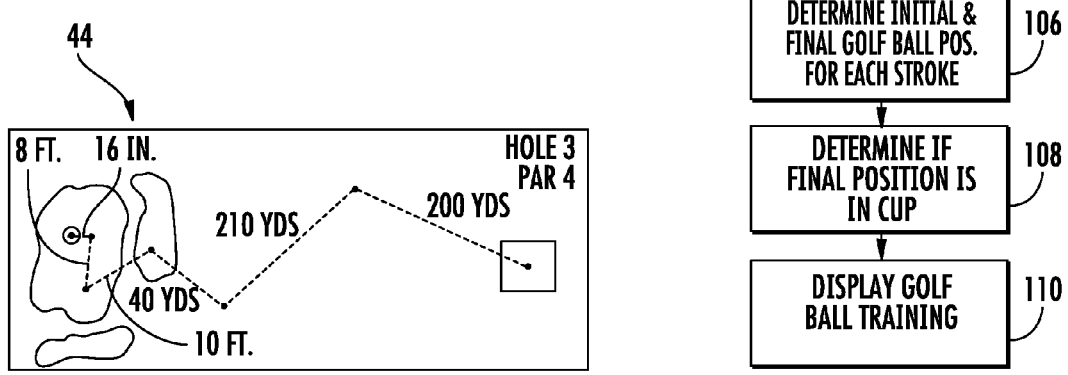
FIG. 3 is a flowchart illustrating a stroke tracking method of the caddie system.

In the stroke tracking mode, caddie system 20 tracks the number of strokes and/or positions of the golf ball during play on a hole. When in the stroke tracking mode, caddie system 20 carries out method 100 set forth in FIG. 3.

As indicated by step 102, electronic device 24 receives signals from sensor 28 within golf ball 22. As indicated by step 104, based upon the signals received from sensor 28, processor 48, following instructions contained in memory 52, determines the number of strokes. In one implementation, signals received from sensor 28 indicate impacts of a golf club with ball 22 (such as sensed vibration of ball 22), wherein each distinct impact of golf ball 22 identifies a different striking or stroke of golf ball 22.

As indicated by step 106, based upon signals received from sensor 28, processor 48, following instructions contained in memory 52, determines an initial golf ball position and a final golf ball position for each stroke. In one implementation, the initial golf ball position is the sensed position of the ball (described above) prior to sensed motion of golf ball 22 and the final golf ball position is the sensed position of the ball following sensed motion of golf ball 22. In one implementation, the sensed position of the ball may be determined using a global positioning system sensor within golf ball 22. As noted above, in another implementation, the sensed positioning of the ball (initial and final golf ball positions of each stroke) may be in terms of relative positions of the ball with respect to the cup and may be determined and stored after the final stroke for a particular hole which resulted in the ball landing in the cup (the hole been completed).

As indicated by step 108, processor 48, following instructions contained in memory 52, further determines if an identified final position of the golf ball is in the cup or in the hole. In one implementation, such a determination is made by processor 48 comparing sensed vibration from a golf ball 22 with a predefined signature vibration characteristic associated with the golf ball bouncing in the bottom of a cup or hole. In another implementation, the determination of whether the final position of the golf ball is in a cup may be determined by processor 48 comparing sensed acceleration or vertical positioning of golf ball 22, wherein the sensing of a sudden drop in elevation of a golf ball is used to indicate that the ball has fallen into the cup.

In one implementation, processor 48 determines whether the final position of the golf ball is in a cup based upon a sensed trace of translational movement or rotational movement, such as a trace of translational acceleration or rotational acceleration, of the ball. In such an implementation, processor 48 compares the trace of translational movement or rotational movement of the golf ball with a database of prior patterns or signature traces of translational acceleration and/or rotational acceleration of the ball known to result in the golf ball falling into the cup.

To determine whether the final position of the golf ball is in the cup, processor 48, under the direction of software, code or program logic provided by a determination module contained in memory 52, compares the traces resulting from the signals received from sensors 28 to the stored signature traces. By identifying the signature trace that best matches the pattern or trace of signals received during a stroke, system 20 determines whether the stroke resulted in the ball falling into the cup to complete the hole or remaining outside the cup, requiring additional strokes to complete the hole.

FIG. 3A illustrates an example golf ball putt acceleration signature trace 120 (acceleration magnitude in terms of gravity (g)) of a made 10 foot putt generated based upon signals received from golf ball 22. FIG. 3B illustrates an example golf ball putt spin signature trace 122 for the same made putt represented by FIG. 3A. In the example illustrated, the ball is initially at rest as represented by the acceleration magnitude value of 1 from time zero to time 1 (the time at which the ball is impacted). The acceleration magnitude value of 1 is due to gravity. The initial spike 124 results from and represents impact of the putter with the golf ball. The secondary spike 125 results from and represents acceleration of the golf ball impacting the green, after a momentary skip. As shown by FIG. 3B, trace 122 comprises trace portions 126 and 127 resulting from changes in velocity of the golf ball upon being struck by the putter and upon subsequently impacting the green, respectively.

As shown by trace portion 128 in FIG. 3A, acceleration of the ball remain substantially constant as the ball 22 rolls towards the hole. As shown by trace portion 129 in FIG. 3B, spin velocity of the golf ball 22 gradually decreases as the ball is rolling towards the hole.

As indicated by trace portion 130 in FIG. 3A, acceleration of the ball drastically falls as a ball is free falling to the bottom of the cup. As indicated by trace portion 131 in FIG. 3B, spin velocity of the ball spikes as the ball rolls over the side of the cup and falls to the bottom of the cup. Lastly, as indicated by the series of closely timed spikes 132 in FIG. 3A, acceleration of the golf ball quickly rises and falls as the golf ball bounces for a short time on the bottom of the cup. As indicated by trace portion 133 in FIG. 3B, spin velocity of the golf ball decreases, in a somewhat stepped fashion, as a golf ball bounces and ultimately settles at the bottom of the cup. The shape or configuration of each of such portions of trace 120 and 122 serve as signatures that are used by system 20 to identify the current state of the golf ball during a stroke. Portions 124 and 126 indicate when the golf ball is struck. Portion 125 and 127 indicate when the golf ball impacts a green, further indicating momentary skip of the golf ball for the putt. Portions 124 and 126 further indicate the force that which the golf ball is struck and, in combination with portions 128 and 129, indicate the distance traveled by the golf ball. Portions 130, 131, 132 and 133 indicate when and if the golf ball has fallen into the cup and the hole has been completed. Although the amplitude and time duration of the different patterns may change from stroke to stroke depending upon the exact conditions of the putt such as whether a putt is a downhill putt or an uphill putt or as whether the putt is made on a fast green, a slow green, a green covered with dew or the like, the general shape and basic characteristics of each trace portion remains essentially the same from putt to putt. System 20 compares the trace of a given putt against such previously determined signature traces for made putts to determine whether the given putt is also a made putt. For example, if a given putt has an acceleration trace having a similar shape to that of trace portions 130, 132 and/or a spin velocity trace having a similar shape to that of trace portions 131, 133, system 20 concludes that the given putt was a made putt.

FIGS. 3A and 3B illustrate example signature traces for a made putt in which the putt is "pure", the golf ball rolls directly into the cup without impacting a rear wall of the cup or rolling around the side, edge or lip of the cup. FIGS. 3C, 3D, 3E and 3F illustrate example traces for other made putts in which the golf ball enters the cup in other fashions. FIGS. 3C and 3D illustrate an example ball acceleration trace and an example ball spin velocity trace for a made putt in which the golf ball rolls directly into the cup, but has sufficient speed such that it impacts a rear wall of the cup, the wall of the cup opposite the side at which the ball enters the cup.

As shown by FIGS. 3C and 3D, the traces for the putt has similar characteristics to the putt represented in FIGS. 3A and 3B up until the point at which the golf ball enters a cup or is about to enter the cup. In particular, the golf ball acceleration trace 134, similar to acceleration trace 120, comprises trace portion 124 which results from the golf ball being struck followed by spike or trace portion 125 which a golf ball impacts the green, further followed by trace portion 128 in which acceleration is flat as a ball rolls towards the hole. Likewise, golf ball spin velocity trace 136, similar to spin velocity trace 122, comprises trace portion 126 resulting from the ball being struck, followed by trace portion 127 resulting from the golf ball impacting the green and further followed by trace portion 129 in which the spin velocity of the golf ball gradually decreases in a linear fashion as the ball rolls towards the hole.

In contrast to the putt represented by FIGS. 3A and 3B, traces 134, 136 have distinctly different signature patterns or shapes due to the distinctly different manner in which the golf ball is entering the cup. As shown by FIG. 3C, trace 134 comprises an initial spike 137 which precedes any sudden drop in acceleration. Spike 137 results from the golf ball impacting the back or rear wall of the cup. Thereafter, trace 134 may comprise additional spikes depending on the velocity, wherein such additional spikes result from the ball striking other sides of the cup prior to the golf ball impacting the bottom of the cup. In the example illustrated, trace 134 comprises spike portion 138 which results from and indicates ball bouncing off the rear wall and impacting the front of the cup prior to settling and bouncing on the floor the cup as indicated by spikes 130.

As shown by FIG. 3C, in contrast to the sharp increase in ball spin velocity resulting from the golf ball free falling downward into the cup towards the bottom of the cup, as represented by trace portion 130 in FIG. 3B, ball spin velocity trace 136 comprises trace portion 139 indicating a sharp and almost vertical decrease in ball spin velocity as a result of the ball impacting the rear wall of the cup. Thereafter, as indicated by trace portion 131, the ball spin velocity, once again, decreases, in a somewhat stepped fashion, as a golf ball bounces and ultimately settles at the bottom of the cup. The duration of the putt also varies. The made putt represented in FIGS. 3A and 3B has duration of approximately 8 seconds from impact to dropping into the hole. The made putt of FIGS. 3C and 3D has a duration of approximately 4 seconds meaning that the golf ball is rolling faster as it reaches the hole and therefore impacts the rear wall or rear portion of the cup before impacting the bottom of the hole.

Figure 3E:
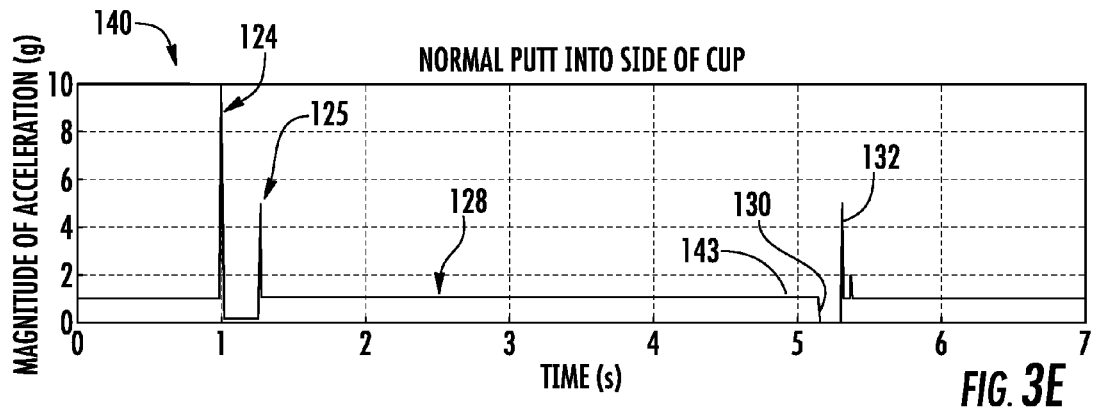
FIG. 3E is a diagram of an example signature acceleration trace for a made putt resulting in a golf ball rolling along a lip of the cup.
Figure 3F:
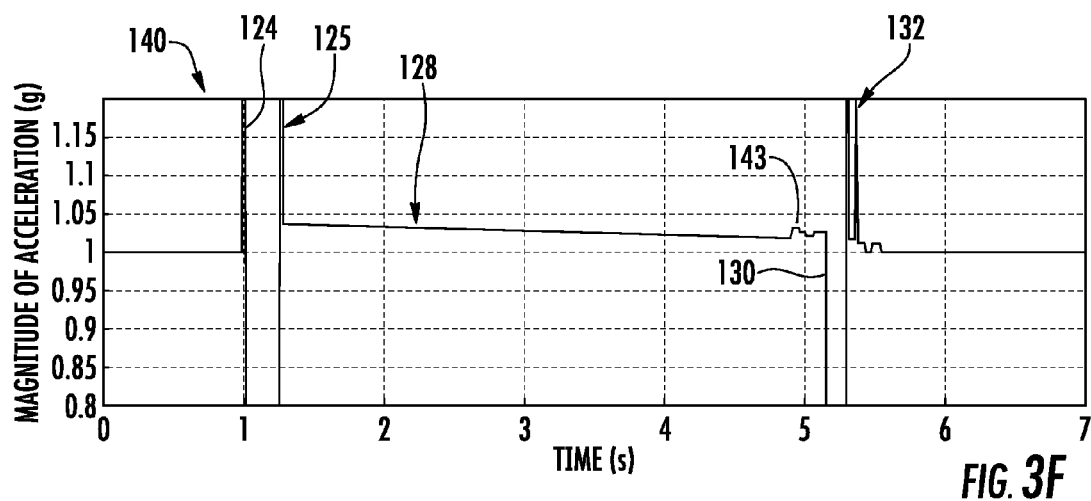
FIG. 3F is a diagram of the signature acceleration trace of FIG. 3E with a smaller y axis scale.
Figure 3G:
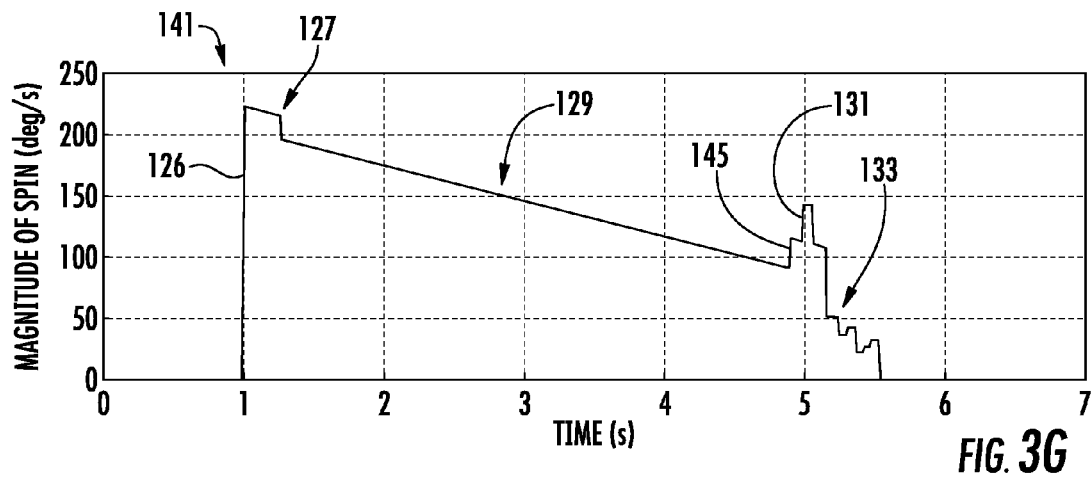
FIG. 3G is a diagram of an example signature spin velocity trace for the putt of FIG. 3E.

FIGS. 3E-3F illustrate an example ball acceleration for a made putt in which the golf ball rolls indirectly into the cup, such as where the golf ball catches a side edge or lip of the cup and rolls circumferentially at least partially about a centerline of the cup. FIG. 3F is an enlarged view of the trace of FIG. 3E having a smaller y-axis scale for acceleration. FIG. 3G illustrate an example spin velocity trace for the made putt represented by FIGS. 3E and 3F. As shown by FIGS. 3E-3G, the traces for the putt has similar characteristics to the putt represented in FIGS. 3A and 3B up until the point at which the golf ball enters a cup or is about to enter the cup. In particular, the golf ball acceleration trace 140, similar to acceleration trace 120, comprises trace portion 124 which results from the golf ball being struck, followed by trace portion 125 which results from the golf ball impacting the green, further followed by trace portion 128 tracking a relatively flat acceleration as a ball roll towards the cup. Likewise, golf ball spin velocity trace 141 in FIG. 3G, similar to spin velocity trace 122, further comprises trace portion 126 resulting from the ball being struck, followed by trace portion 127 resulting from the ball impacting the green and trace portion 129 in which the spin velocity of the golf ball gradually decreases in a linear fashion as the ball rolls towards the hole.

In contrast to the putt represented by FIGS. 3A and 3B, traces 140, 141 have distinctly different signature patterns or shapes due to the distinctly different manner in which the golf ball is entering the cup. As shown by FIGS. 3E and 3F, trace 140 comprises an initial acceleration bump 143 which precedes the sudden drop in acceleration represented by trace portion 128. Acceleration bump 143 results from the golf ball accelerating at a slightly greater rate as a golf ball begins to rotate along the lip of the cup. As further shown by such traces (FIG. 3F), this results in a lapsed period of time from bump 143 to trace portion 130, the time during which the ball rolls along the side edge or lip of the cup prior to free falling into the cup. As shown by FIG. 3G, at the same time that the golf ball is undergoing the acceleration bump 143 shown in FIGS. 3E and 3F, the golf ball undergoes a slight step up in spin velocity as represented by trace portion 145. Thereafter, trace 140 comprises trace portions 130 and 132 while trace 141 comprises trace portions 131, each of which is described above. As shown by FIG. 3G, trace 141 comprises trace portion 147 which corresponds to trace portion 133 of the earlier described made putts except that trace portion 147 exhibits a higher spin rate, prior to coming to rest at the bottom of the cup, resulting from the golf ball initially rolling along the bottom of the cup.

As shown by FIGS. 3A-3G, system 20 not only determines whether a putt is a made putt, but also determines and distinguishes between different made putts based upon how the golf ball entered the cup. Using previously acquired and stored signature traces for previously made putts having stored cup entrance characteristics, system 20 is able to determine whether the golf ball entered the cup by simply falling into the cup, by impacting the rear wall of the cup or by rolling partially about the cup along the lip of the cup. System 20 stores data regarding how the golf ball entered the cup. As a result, the golfer may later review and analyze differences between putts from similar locations. The system 20 can also identify when the acceleration and/or rotational data or traces do not include spikes indicating the golf ball falling into the hole. Accordingly, if the system 20 does not recognize one of these patterns indicating a made putt, the system 20 can identify the putt as a missed putt.

For example, if the data presented by system 20 reveals that a particular previously made putt resulted in the golf ball impacting the rear wall of the cup, the golfer may ascertain that the prior putt had too much speed and may decide to reduce the speed of an upcoming similar putt from a similar location on the green to reduce likelihood of a miss resulting from the subsequent putt flipping out or a miss resulting the golf ball rolling well past the hole. Likewise, if the data presented by system 20 reveals that a particular previously made putt resulted in the golf ball rolling along beside it is or lip of the cup, the golfer may utilize a slightly different directional vector for the subsequent putt from a similar location on the green.

As will be described hereafter, in the stroke guidance mode, system 20 offers guidance to the golfer regarding an upcoming putt. In some implementations, when operating in the stroke guidance mode, system 20 additionally utilizes stored data indicating how the golf ball entered the cup during a made putt to adjust a recommendation to the golfer for an upcoming putt. In one implementation, system 20 filters out those made putts which are not "pure" (i.e., those made putts that impacted the rear of the top or rolled along the side edge of the cup) when selecting previously made putts from which data is used to output a recommendation.

In another implementation, system 20 utilizes all data of previously made putts from similar locations on the green to similar located holes, but takes into account the characteristics by which the ball entered the cup. In one implementation, system 20 applies a lesser weight to data from those parts that are not "pure". In another implementation, system 20 applies speed and/or directional adjustments to the data of those parts that are not "pure". For example, if the data stored by system 20 reveals that a particular previously made putt from a similar location on the green to a similarly located cup resulted in the golf ball impacting the rear wall of the cup, system 20 ascertains that the prior putt had too much speed and may display or output a recommended putt having an adjusted slower speed to reduce likelihood of a miss resulting from the subsequent putt flipping out or a miss resulting the golf ball rolling well past the hole. Likewise, if the data stored by system 20 reveals that a particular previously made putt resulted in the golf ball rolling along a side edge or lip of the cup, system 20 outputs a recommended putt that automatically compensates for the less-than-perfect entrance of the golf ball into the cup by outputting adjusted different directional vector for the subsequent putt from a similar location on the green to the similarly located hole.

In one implementation, processor 48, following instructions contained in memory 52, continuously updates and validates made putt signature traces 120, 122, 134, 136, 140 and 141 while in use. In effect, processor 48 and instructions in memory 52 form a neural network by which system 20 continually learns and improves upon its make-miss detection accuracy. For example, system 20 is initially provided with a starting or default database of signatures. However, such pre-formulated or standardized signatures for putt attempts, provided by the golf ball or application provider, may not take into account unique or particular characteristics of the green, the putting style of the golfer, the characteristics of the particular golf ball or the size of the hole. For example, a green may be slow or fast. The golf ball may have different spin characteristics or have different characteristics due to its age. To address such irregularities, in one implementation, after each putt attempt, system 20 outputs an initial determination of whether a putt attempt resulted in a made putt. System 20 further prompts or requests the user to provide feedback regarding the results of the putt through an input device, such as a touchscreen, keypad, keyboard or microphone. Using feedback received from the person putting the golf ball or another person, system 20 confirms the prior determination or corrects the prior determination. As a result, system 20 calibrates and customizes the pre-provided standardized signatures to the unique characteristics of the golfer's putting style, the particular characteristics of the golf ball being used, the green, or other factors.

In one implementation, the user of system 20 may "teach" system 20 and assist system 20 in building a database of make-miss signatures by taking different parts from different locations. During such parts, system 20 senses various attributes of the shot or of the golf ball. Following the putt, the user may input to system 20 an indication of whether the putt was a made putt or a missed putt. In some implementations, the user may input to system 20 additional details regarding the made putt such as whether the putt impacted the rear wall of the cup or rolled partially about the cup, along the lip of the cup. Utilizing such input information received from the user or from multiple users with respect to multiple putts over time, system 20 compares the received signals from the golf ball 22 to the feedback from the user to recognize signal patterns, amplitudes or other signal characteristics corresponding to the made putt being pure, the putt resulting in the golf ball impacting the rear wall of the cup or the putt rolling along the side edge or lip of the cup.

In some implementations, system 20 additionally prompts for the input of information regarding missed putts, such as how far the missed putt rolled past the hole, how short the missed putt was from the hole, on what side of the hole the golf ball rolled or on what side edge the golf ball caught before lipping out. In such an implementation, system 20 builds a database of missed putt characteristics from particular locations on the green to particular hole locations. This database is also used by system 20 to provide the golf with subsequent feedback and/or output recommendations when the golfer encounters a similar putt from a similar location on the green. Overall, in such an implementation, system 20 builds its own database of made and missed putt signatures for subsequent use in determining made putts and miss putts without such user feedback.

In one implementation, the user is prompted or instructed to build such putt signature database by taking multiple putts from various locations and speaking or yelling the results of the putt. For example, the golfer, just prior putting the ball, may say "putt" which is received by a microphone and recognize my speech recognition software such that data acquisition device 40 polls or receives information from golf ball 22. After completion of the putt, the golfer is instructed to yell or say either "make" or "miss", wherein such spoken words are captured by the microphone and recognized or discerned by speech recognition software. The received and discerned words "make" or "miss" trigger the processor 48 to identify the end of the putt, to store the signals pertaining to the just completed shot and to identify the putt as either a made putt or a missed putt. In one implementation, the user may additionally verbalize additional details or feedback to system 20 for the putt being sensed such as an approximate distance from the hole, whether the putt impacted the rear wall of the cup, whether the putt was pure or whether the putt "lipped" in a rolling along the side edge of the cup prior to falling. Such additional details verbalized by the user are further recognized by speech recognition software, recorded/stored in memory and assigned to the sense shot for later analysis and make-miss "learning". Through multiple repetitions, system 20 acquires sufficient data to distinguish between made and miss putts based upon different sense characteristics of a putted golf ball 22.

In one implementation, at the beginning of the hole, at the tee box of the hole, the golfer may be prompted to indicate the initiation of a new hole. In another implementation, at the beginning of the hole, processor 48 may identify the next stroke as being from the tee box based upon GPS or other location signals received from golf ball 22. In yet another implementation, at the beginning of the hole, processor 48 may receive signals from a distinct transmitter at the tee box, such as a transmitter associated with tee box markers or other tee box location identifying signal transmitters. Using such information, processor 48 identifies the stroke from the tee as the initial stroke for the hole. Until processor 48 determines that the final position of the golf ball following a stroke is in the cup, processor 48 utilizes the final golf ball position of the preceding stroke as the initial golf ball position for the next successive stroke.

In one implementation, processor 48 may further utilize signals received from sensor 28 to identify a "drop" of the golf ball, such as when the ball is dropped to gain relief. In one implementation, signals indicating a rapid vertical rise or a rapid vertical drop of the golf ball from a minimum height may indicate a drop of the golf ball. In such an implementation, caddie system 20 further tracks the position of the golf ball before and after such a "drop".

In some implementations, electronic device 24 may further utilize signals from sensor 28 to indicate the position of the golf ball to assist the golfer in locating the golf ball, wherein electronic device 24 audibly or visually indicates the position of the golf ball or audibly or visually directs the golfer towards the missing golf ball. In one implementation, golf ball 22 may additionally include an audible signal generator, wherein electronic device 24 transmits signals causing golf ball 22 to audibly indicate its position when lost. In another implementation, golf ball 22 may additionally include a light generator, wherein electronic device 24 transmits signals causing golf ball 22 to generate light or change its color to indicate its position when lost.

Figure 4:
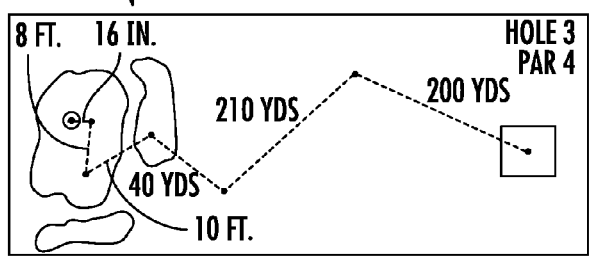
FIG. 4 illustrates an example display screen present on an output by a processor for one example hole of the caddie system.

As indicated by step 110, processor 48, following instructions contained in memory 52, displays the golf ball tracking on output 44. FIG. 4 illustrates an example display screen present on output 44 by processor 48 for one example hole. As shown by FIG. 4, the initial and final positions of the golf ball for each stroke are displayed. In one implementation, yardage for each stroke is further presented. In yet another implementation, using signals received from sensor 28 and golf ball 22, processor 48 may further determine the path or trajectory of the golf ball between initial position in the final position during a stroke (a draw, a fade or straight shot; curved path of ball on green etc.) and further visibly indicate the trajectory as part of the example output 44. This information may be stored in memory 52 by processor 48 for subsequent retrieval and comparison with a golf first performance on the same hole during other golfing outings or sessions. In one implementation, output 44 serves as a graphical user interface, whereby individual segments or strokes of play for a hole can be selected by positioning of the cursor or through a touchscreen. Upon such individual strokes of play for holding selected, processor 48 switches to a display which illustrates details for the selected stroke.

In one implementation, processor 48 may be configured to concurrently display the tracking of play on a golf hole from multiple sessions, allowing the golfer to compare his or her performance on the particular hole during the different golf outings or different days/sessions. In one implementation, different outings may be represented by different colors, levels of brightness, line characteristics or the like. In such a mode, caddie system 20 allows the golfer to visibly see his or her progress or improvement on a hole over a period of time or permits the golfer to compare the results of different hole strategies (laying up, playing the left side of the fairway, playing the right side of the fairway, and the like) for a particular hole.

Stroke Guidance Mode

In the stroke guidance mode, processor 48 utilizes the current position of golf balls 22 (as determined from signals 28 from golf ball 22) to present different recommendations for the next successive stroke. In a stroke guidance mode, caddie system 20 provides historical strokes from several initial golf ball locations, allowing the golfer to select a historical stroke for emulation or adjustment. In essence, caddie system 20 provides a golfer with little experience on a particular hole or on a particular golf course with perspective and insight as to how a hole might be played, ranging from the clubs and distances off the tee to the green as well as different putting strategies. Caddie system 20 acts as a local caddie, providing the golfer with experience-based insight and strategy for playing a hole.

In one implementation, caddie system 20 operates in the stroke guidance mode by carrying out the example method 150 shown in FIG. 5. As indicated by step 152, electronic device 24 receives (via data acquisition device 40) signals from sensor 28 (via signal transmitter 30) within golf ball 22. As indicated by step 154, based upon such signals, processor 48, following instructor contain a memory 52, determines the current position of golf ball 22. For example, processor 48 may identify wherein the fairway the ball is located or where on the green the ball is located. In one implementation, the position may be determined utilizing GPS signals. In one implementation, position may be determined using a combination of multiple signals, such as GPS signals as well as a determined flight or trajectory the golf ball during a stroke using accelerometers, magnetometers and other sensors of sensor 28.

As indicated by step 156, based upon the determined position of golf ball 22, processor 48, following instructions contained in memory 52, selects one or more stroke recommendations from a database of stored strokes having initial ball positions within a predefined zone including the determined position of golf ball 22. In one implementation, each stroke recommendation comprises one or more previously sensed parameters or attributes of a golf ball identical or substantially similar to golf ball 22 (in terms of performance) struck by the same golfer at an earlier time or struck by another person such as a professional golfer, a celebrity golfer, a golf instructor or the like. By presenting attributes of a prior golf ball stroke from approximately the same position, caddie system 20 provides the golfer with advice or guidance such that the golfer can try to use or match one of the previously recommended strokes so as to achieve the same stroke attributes for the same result.

In the example illustrated, processor 48 searches the database of possible previously recorded golf ball strokes based upon the initial golf ball position of the previously recorded golf ball strokes. Those previously recorded golf ball strokes having an initial golf ball position that closely approximate the current position of the golf ball about to be struck are identified. Because previously recorded golf ball strokes having initial golf ball positions that closely approximate the current position of the golf ball are identified, utilizing the stroke attributes of the previously recorded golf ball strokes when striking the golf ball 22 from the current golf ball position will yield similar predictable results.

In one implementation, processor 48 identifies those previously recorded golf ball strokes having an initial golf ball position within a zone that also contains the current position of the golf ball identified. In one implementation, the zone may comprise an annular ring about the cup such that each of the previously recorded golf ball strokes identified by the processor 48 have an initial golf ball position within the same band of distances from the cup as a current golf ball position. In another implementation, the zone may comprise a pie shaped angular sector radially extending from the top with the current ball position angularly centered within the sector. In one implementation, the angular extent of the sector is user adjustable. In one implementation, the zone may comprise portions of an annular ring or band having a range of distances from the cup, wherein the portions are also contained within the predefined angular sector with respect to the cup. In another implementation, the zone comprises a region of the green having a predetermined elevation range with respect to an elevation of the cup. For example, the current position of the golf ball may be on or above a ridge elevated above the cup. In such a circumstance, the zone may include golf ball positions adjacent the current position of the golf ball and also on or above the ridge. By defining the zone so as to include ball positions at substantially the same or within a predefined range of elevations with respect to the cup, rather than simply based upon distance from the cup, golf ball positions below the ridge, which may require drastically different strokes for success, are filtered out. In yet other implementations, characteristics other than pure distance from the cup or elevation with respect to the cup may be utilized to find a zone containing initial ball locations for previously recorded strokes.

In one implementation, processor 48 automatically selects what criteria to use when defining the zone or automatically enlarges or reduces the boundaries of the zone based upon the number of available pre-recorded strokes that will fall within the zone. For example, if a first zone yields a number of pre-recorded strokes that exceeds a user selected or predefined number of strokes, processor 48 may automatically shrink the size of the range of distances (the width of the annular ring about the cup), may shrink the angular extent of the angular sector, may angularly shift or rotate the angular sector with respect to or about the cup (such that the current position of the golf ball is no longer centered within the angular sector) and/or utilize additional zone defining criteria to identify a second smaller zone that meets the predefined number of strokes for display. Likewise, if a first default zone yields a number of prerecorded strokes for display that is less than a user selected a predefined number of strokes, processor 48 may automatically enlarge the size of the zone such as by enlarging the range of distances (the width of the annular ring about the cup), enlarged angular extent of the angular sector (for example, enlarging angular sector from 15° to 30°), may angularly shift or rotate the angular sector with respect to or about the cup and/or utilize fewer zone defining criteria to identify a second larger zone that yields a greater number of prerecorded strokes.

FIGS. 6 and 7 illustrate an example operation of caddie system 20 in the stroke guidance mode. FIG. 6 illustrates an example green 200 having a cup or hole 202. FIG. 6 illustrates an example current ball position 204. FIG. 6 further illustrates initial ball positions 206A, 206B, 206C, 206D, 206E, 206F and 206G of previous the recorded strokes stored on a database shown in FIG. 7. Each ball position 206 may be defined using any of various coordinate systems using the location of hole 202 or using other reference points. In one implementation, processor 28 may select or recommend a stroke for display based upon those previously recorded stroke attributes having a position within a common range of distances from the hole. For example, processor 48 may define the zone as a range of distances 208 which comprise an annular ring containing those previous recorded golf ball strokes having initial ball positions located at least a distance A less than or equal to a distance B from cup 202. In such an implementation, processor 48 will output the stroke attributes of the previous recorded strokes having initial ball locations 206A, 206B and 206G while excluding the other previously recorded strokes having initial ball locations outside of the annular ring 210. In one implementation, processor 48 may adjust the size of the annular ring based upon the current sensed, input or otherwise provided green speed. In one implementation, processor 48 bases its selection of one or more recommended strokes depending upon whether the previously recorded strokes have initial ball positions within a predefined angular sector 211 with respect to hole 202. In one implementation, the angular extent of sector 211 is user adjustable. Using such criteria, processor 48 would display previous the recorded strokes having the initial ball positions 206A, 206B, 206C and 206G. In yet another implementation, processor 48 may utilize both the ring/range of distances 208 and the angular sector 211 in combination with one another as the zone for determining what pre-recorded strokes to recommend. Using such criteria, processor 48 presents or selects the previous recorded strokes having initial positions 206A, 206B and 206G, but not 206C. In yet another implementation, such as where there is a significant elevation change or ridge indicated by topo line 212, processor 48 may define a zone utilizing topo line 212 as a boundary of the zone. In such an alternative implementation, processor 48 will identify and output the stroke attributes of previously recorded strokes having initial ball locations 206A, 206B and 206C. In some implementations, the zone utilized the processor 48 to determine which prior record strokes to present or recommend is based upon multiple combined criteria such as an angular sector, and annular ring and further determined by known topo lines.

In yet other implementations, processor 48 determines which previously recorded strokes to display or recommend additionally or alternatively based upon an extent to which the recorded travel path of the previously recorded stroke coincides with the travel path of a previously recorded stroke that was successful (in the cup) or coincides with a processor identified vector extending from the current ball position to the hole. In some implementations, in addition to or in lieu of presenting previously recorded strokes, processor 48 generates a completely new or artificial recommended stroke based upon or using previously recorded strokes. In one implementation, processor 48 may utilize only portions of individual previously recorded strokes and based upon such portions, generate the completely new recommended stroke, presenting attributes of the new recommended stroke and possibly displaying a simulation of the new recommended stroke. For example, previous recorded strokes having initial ball positions well outside the current ball position with respect to the hole may be outside the zone containing the current ball position, but have portions of their path of travel that cross the zone or lie between the current ball position and the hole. In such circumstances, processor 48 may utilize sensed and recorded data of the previous recorded strokes from only those portions of the path of travel that lie between the current position of the ball in the hole to generate a new hypothetical recommended stroke.

FIG. 8A illustrates an example of processor 48 generating a new recommended stroke 260 from the current ball position 204 to hole 202 utilizing portions of data from prior recorded strokes 262, 263. Processor 48 determines those portions of the path of travel of each of stroke 262, 263 which extend between the current ball position 204 and hole 202, which cross a predefined zone containing the current ball position 204 and/or which lie within a predetermined intermediate zone between the current ball position 204 and hole 202. In the example illustrated, processor 48 determines that portions 265 and 266 of prior strokes 262, 263, respectively, sufficiently coincide with the anticipated path of travel from the current ball position 204 to hole 202. Once processor 48 has identified those portions of the path of travel of each of the previous recorded strokes for use in generating a new recommended stroke, processor 48 then utilizes the sensed and recorded data of portions 265, 266 (the acceleration, speed, direction of travel, spin and the like of the ball as it is traveling along portions 265, 266) to generate a new recommended stroke 260. In one implementation, processor 40 may completely disregard and not use any data from portions of the travel path of stroke 262, 263 which lie outside of portions 265, 266.

In another implementation, processor 40 assigns a weight to such previous recorded data depending upon the proximity of the location of the ball when the data is taken to the zone containing the current ball position 204, the current ball position 204 or a linear vector between the current ball position 204 and hole 202. For example, processor 48 may assign a greater weight to the data of the previously recorded stroke 262 sensed at the moment that the ball is at location 267 as compared to the weight assigned to the data of the previously recorded stroke 262 sensed at the moment that the ball is at location 268 or as compared to the weight assigned to the data of the previous recorded stroke 263 sensed at the moment that the ball is at location 269 when determining or generating the processor generated recommended stroke 260. In such a manner, processor 48 may present a more accurate or better stroke recommendation even in circumstances where there is not a large number of prior recorded strokes having initial ball positions within the zone. In some implementations, processor 48 may create and present a processor generated recommended stroke utilizing data from both prior recorded strokes having initial ball positions within the zone containing the current ball position as well as previous recorded strokes having initial ball positions outside the zone, wherein only portions of the data from the previous recorded strokes having initial ball positions outside the zone are utilized. In some implementations, data from previous recorded strokes having initial ball positions within the zone may be given a greater weight as compared to the weight given to the data from previously recorded strokes having initial ball positions outside the zone.

As indicated by step 158 in FIG. 5, once processor 48 has identified one or more previously recorded strokes ("stroke recommendations") from locations having characteristics similar to that of the current position of golf ball 22, processor 48 presents the previous recorded attributes of such previously recorded strokes. Such information may be found in the table 250 shown in FIG. 7 depicting multiple sets of associated data for previously recorded strokes having initial ball positions 206 ("Pos."). The associated data may include multiple pieces of information related to the particular recorded stroke, depending on the type of stroke (a putt, chip, pitch, tee shot or full swing), such as the coordinates, elevation and lie of the golf ball, the force applied to the golf ball, the speed or velocity at which the golf ball traveled, the direction or vector in which the golf ball traveled, the rotational axis and/or spin velocity of the golf ball, the launch angle of the golf ball, the maximum height attained by the golf ball during its flight, the time or distance the golf ball was in flight, the time or distance the golf ball was rolling, the time and location which the golf ball assumed a true roll condition, club impact location upon the golf ball, and golf club type used for the stroke, as well as environmental conditions such as green speed, temperature, humidity, dampness of the green, wind velocity, wind direction and the like. In one implementation, processor 48 may output and display all or portions of the associated set of data for the previously recorded stroke. In the example illustrated, display 250 provides the amount of force, the associated vector (angular direction of the stroke), the spin of the golf ball during the stroke, and the obtained or determined green speed at the particular time of the prior stroke. In one implementation, caddie system 20 may have offer selectable options along the golfer to customize what piece of data from the recorded sets of data are displayed for each recommended previously recorded stroke.

In one implementation, processor 48 may further indicate the amount of force stored for each of the previously recorded strokes in terms of the most recent stroke of the same type by the person golfing. For example, if the recorded stroke is a putt, processor 48 displays the recorded force of the recorded putt in terms relative to the most recent putt by the golfer, whether it be on the same green or the green on the immediately prior hole. For instance, if the most recent putt by the golfer, as sensed by ball 22, had a velocity of X or an impact force of Y, processor 48 may output an indication of how the force of the recorded putt compares, (i.e. 80% of X, 150% of X, 50% of Y, 200% of Y). In such a manner, the golfer is provided with an indication of how hard to stroke the golf ball based upon an immediate memory of the golfer.

In one implementation, system 20 outputs the recommended amount of force for a putt in terms of an amount of force that would be applied on a flat terrain for a given distance and for typical or average green speed. For example, for an uphill putt and/or for a putt on an extremely slow green (such as on a green that is been recently aerated), system 20 may output a recommendation to the golfer that he or she putt the golf ball as if the hole were behind the actual hole by distance determined by system 20. In one instance, system 20 may output a recommendation that the golfer putt the golf ball as if the hole were 2 feet behind the actual hole location. Likewise, for a downhill putt and/or a green having a green speed that is faster or quicker than the typical or average green speed (a green mode short, a hard green or the like), system 20 may output a recommendation to the golfer that he or she putt the golf ball as if the hole were in front of the actual hole by a distance determined by system 20. In one instance, system 20 may output a recommendation of the golfer putt the golf ball is the hole were 3 foot in front of the actual hole location.

In one implementation, the previously recorded strokes having the selected initial ball positions may have associated stored animations, graphics or videos depicting the travel of the golf ball on green 200 during the stroke. As a result, the golfer may visibly see the ball as it travels through breaks and curls on its way to cup 202 for each of the recorded strokes. FIG. 8 illustrates an example output 254 presented by processor 48 in which the previously recorded recommended strokes having the initial ball positions 206A, 206B and 206C are retrieved and displayed. The paths of the recorded strokes are presented by displayed lines 207A, 207B and 207C having the indicated final ball positions 209A, 209B and 209C, respectively. In the example illustrated, the speed or impact force of each stroke is represented by the use of different colors, brightnesses and/or displayed line types. The displayed force may be in terms of absolute values for speed or force and/or may be in terms relative to the immediately prior stroke of the same type as discussed above.

In the example illustrated, only stroke 206C had a final ball position within cup 202 (a made putt). In some implementations, processor 48, when providing a table or other list of the recommended strokes, may order the strokes based upon their final ball position relative to the hole. Prior recorded ball strokes having a final ball position in the hole or closer to the hole will be ranked higher when displayed on the screen. In some implementations, processor 48 may prompt a golfer to input criteria for the display of recommended strokes. For example, based upon one or more selected criteria, processor 48 filters out and does not display previously recorded recommended strokes falling within the zone that did not have a final ball position within the cup, within a predefined distance of the cup and/or on a particular side of the cup (such as when the golfer desires to have a subsequent second uphill putt versus a subsequent second downhill putt if the initial, first attempted putt is unsuccessful). In another implementation, processor 48 provides a golfer with a full spectrum of final ball positions relative to the hole (final ball positions in front of the hole, to the right of the hole, to the left of the hole and behind the hole) and filters out (does not output or display information pertaining to) redundant strokes having similar final ball positions relative to the hole. With such an implementation, the golfer is able to see different options for the upcoming stroke and the predicted result for the upcoming stroke. Should the golfer choose to emulate a prior recorded stroke that did not have a final ball position in the cup, the golfer may adjust the parameters of the selected prior recorded golf stroke taking into account the final ball position of the prior recorded golf stroke. In one implementation, processor 48 may output a recommended adjustment (either the direction/vector and/or the applied force of stroke) for each prior recorded stroke not having a final ball position within the cup.

Although FIGS. 6, 7 and 8 describe the operation of caddie system 20 with respect to a current golf ball position on green 200 with the objective of sinking a putt in cup 202, caddie system 20 will also operate similarly with respect to a current golf ball position off of the green (such as in a sand trap, on the fairway or off the fairway in the rough or on the fringe), wherein the objective may be either to land the golf ball on the green and roll golf ball into or close to the cup or to simply land the golf ball on the green from the fairway or off of the fairway or to land the golf ball at a certain location or a certain distance in the fairway from the green (such as a first shot on a par 4 hole or the first or second shot for a par 5 hole. In such circumstances, the previously recorded information for strokes may additionally include the type of the golf club used in the recorded stroke. Different stroke recommendations presented by processor 48, based upon the previously recorded strokes having initial ball positions within a same zone as a current ball position, provide the golfer with historical perspective as to different club options in different swing force options for sinking a chip or pitch or for simply landing the golf ball on the green or on a particular portion of the green. In one implementation, in addition to filtering or screening the database of previously recorded strokes based upon the initial ball position of the previously recorded strokes being within the same zone as a current ball position, processor 48 may also filter or screen the one or more databases of previously recorded strokes based upon the type of club use in the previous recorded stroke. For example, a golfer who prefers using a nine iron as compared to a pitching wedge may be provided by processor 48 with a prompt for inputting a priority or preferences for club types, wherein processor 48 will prioritize its display of previously recorded strokes or even completely filter out certain previously recorded strokes additionally based upon the recorded and stored club type for the previously recorded stroke and the golfer's indicated preferences.

In some implementations, the data for previously recorded strokes may additionally include environmental data for the previously recorded stroke such as the wind speed and direction at the time of the previously recorded stroke, the relative green speed of the prior recorded stroke, the temperature or humidity during the prior recorded stroke and the like. In some implementations, processor 48 may apply an additional filter or screen based upon such environmental conditions. For example, processor 48 may not list or display previously recorded strokes which were taken under different environmental conditions (outside a predefined range or zone of environmental conditions, temperature, humidity, green speed, wind speed and direction and the like, containing the current environmental conditions) or may rank such prior recorded strokes lower as being less relevant to the upcoming stroke of the golf ball from the current golf ball position. In some implementations, processor 48 may be operable in a mode wherein processor 48 outputs or displays a recommended adjustment to the attributes of the previously recorded stroke based upon a comparison of the environmental data for each of the recorded strokes with respect to current environmental data (as sensed or retrieved from an external source by electronic device 24 or sensed an output by sensor 28) for the upcoming stroke from the current ball position.

As shown by FIG. 9, in one implementation, processor 48, following instructions contained in memory 52, presents the golfer with a display 270 of multiple available databases of previously recorded shots and prompts the golfer to select one or more of the available databases from which processor 48 will access and retrieve one or more recommended prior recorded strokes based upon the current ball position. Such databases may be stored in memory 52 or may be retrievable from remote databases using one or more servers across a new wired or wireless network (local area network, wide area network/Internet). In the example illustrated, the golfer is allowed to choose from a general population a previous recorded strokes of prior golfers on the golf course for the particular hole, a database of prior strokes by a golf instructor, such as the local or club golf instructor, a general population of professional golfers who may have previously played at the golf course or golfed the particular hole of interest, specific individual persons, such as specific individual professional golfers, or the personal database of previously recorded strokes by the golfer. As indicated by the "$", in some implementations, the maintainer of the database, the golf course or the like may charge a one-time use fee, a subscription fee or other charge for access to the database. In some instances, the databases may be independently created, independently maintained on different servers and independently offered for purchase. In some implementations, some databases may be complementary with a paid round of golf or as part of a golf course membership. In some implementations, caddie system 20 may offer different output/display options or different recorded stroke filtering criteria based upon different subscription fees or different use charges.

Stroke Analysis Mode

In the stroke analysis mode, caddie system 20 allows the golfer to analyze the attributes of an individual stroke and to compare such attributes with prior strokes. Caddie system 20 allows a golfer to identify areas needed for improvement as well as to identify progress towards shot attribute objectives. In some implementations, caddie system 20 utilizes the stroke analysis to fit the golfer to a club, such as a putter, or to fit or recommend a club to a golfer. FIG. 10 illustrates an example method 300 that may be carried out by caddie system 20 when operating in the stroke analysis mode.

As indicated by step 302, processor 48, following instructions contained in memory 52, obtains at least one attribute of a first stroke of a golf ball, the at least one attribute being based upon signals received from at least one sensor carried by the golf ball. The at least one attribute comprises one or more of the following attributes related to the particular recorded stroke, depending on the type of stroke (a putt, chip, pitch, tee shot, full swing, etc.), such as the coordinates, elevation and lie of the golf ball, the force applied to the golf ball, the speed or velocity at which the golf ball traveled, the direction or vector in which the golf ball traveled, the rotational axis and/or spin velocity of the golf ball, the launch angle of the golf ball, the maximum height attained by the golf ball during its flight, the time or distance the golf ball was in flight, the time or distance the golf ball was rolling, the time and location which the golf ball assumed a true roll condition, club impact location upon the golf ball, and golf club type used for the stroke, as well as environmental conditions such as green speed, temperature, humidity, wind velocity, wind direction and the like. Some attributes are received or obtained from signals received from sensor 28 in or carried by golf ball 22. Other attributes are derived from such signals from sensor 28. Yet other attributes are obtained from sensors carried by electronic device 24, obtained from inputs by the golfer others to electronic device 24 (such as through a microphone, touchpad, keypad, keyboard or the like) or from external sources, such as remote databases accessed from servers across a wired or wireless communications network. For some analytical objectives, the initial and final golf ball positions or "launch coordinates" relative to a predefined geographic location (such as the cup) may be relevant and stored. For other analytical objectives, the initial and final golf ball positions only relative to one another may be relevant independent of the relationship between the initial golf ball position and the location of the cup or hole. For example, the initial position of the golf ball relative to the cup or pin may be less relevant and may not be stored or at least not later retrieved by processor 48 from a database when the objective is to track progress for achieving a predetermined minimum amount of backspin on the golf ball with a chip or pitch.

As indicated by step 304, the obtained one or more golf stroke attributes for the first stroke are stored. In addition to raw data, stroke attributes derived or determined by processor 48 from the sensed data received from ball 22 are also stored for later historical review and use such as predicted and actual stroke distances, stroke loft, rolling characteristics and the like. In one implementation, the attributes are stored in memory 52 of electronic device 24. In another implementation, the attributes are transmitted to and stored in a memory remote from electronic device 24. In some implementations, caddie system 20 provides prompts on a display other input device allowing the golfer to customize what attributes are obtained and stored, or for how long such attributes or strokes are stored for subsequent analysis.

As indicated by step 306, electronic device 24 obtains the same one or more attributes acquired for the first stroke for a second stroke. The second stroke can be performed with the same golf ball as the first stroke, or with a second, different golf ball. The second stroke can occur immediately after the first stroke, hours after the first stroke, days after the first stroke, or any duration. As indicated by step 308, processor 48 compares one or more of such attributes of the first stroke and the second stroke and transmits signals providing the results of the comparison for output or display on output 44 or on a remote output that is on a remote monitor or a website. FIG. 11 illustrates an example output 350, in the form of a table, illustrating multiple recorded strokes and their various attributes for comparison. FIG. 12 illustrates an example output 354 for presentation on output 44. Output 354 comprises a graph output by processor 48 depicting progress in one attribute (spin) for a chip. In the example illustrated, the imparted backspin for each stroke taken at time T is represented by a bar graph. In other implementations, other graphics, such as line graphs and the like may be employed. For example, pie graph may be employed to depict percentages of times that strokes achieve target thresholds or may use to depict percentage of time practiced for each objective or each type of stroke.

In other implementations, other attributes may be similarly graphed or visibly represented for comparison. Examples of other attributes of strokes that may be tracked, stored and visibly presented for comparison include, but are not limited to, time or distance of a putt, distance of a made putt, distance of a missed putt, speed of a made putt, speed of a missed putt, break distance of a made putt, chip or pitch or chip to achieving a no slip rolling condition, travel distance, maximum travel loft, travel linearity, roll distance after landing and the like.

In some implementations, such attributes may include the initial location of the golf ball and the final location of the golf ball following the stroke. In such implementations, caddie system 20 may record performance results for different strokes from similar golf ball locations. For example, caddie system 20 may record an output for comparison comprising the number or percentage of putts made from a given location or zone of locations on a green, from a sand trap or from the fringe or off the green. The initial speed of made putts, the speed of made putts approaching the hole may also be outputted for comparison, inspection or analysis. Caddie system 20 may record an output for comparison comprising the number of putts made to within a predefined distance of the cup from long range, from a distance beyond a predefined threshold from the cup. Caddie system 20 may record an output for comparison comprising the different lines of different putts from different locations on the green, allowing the golfer to evaluate and compare his or her performance when playing a break differently (a more linear more aggressive putting approach as compared to a less aggressive stroke utilizing the break to curve or turn the ball towards the cup). The recorded parameters for the different strokes may be utilized by caddie system 20 to form a personal database for the golfer for subsequent use when caddie system 20 is operating in the stroke guidance mode.

In one implementation, processor 48 may present a simulated golf hole on output 44 having a simulated green, a simulated hole position and a simulated ball position. In such a simulation, processor 48 prompts the golfer to take a stroke with or without guidance provided by caddie system 20 in the stroke guidance mode (as discussed above with respect to FIGS. 5-9). The parameter attributes of the stroke made by the golfer are sensed by sensor 28 and received by electronic device 24. Caddie system 20 makes a determination as to whether the simulated golf ball went into the simulated hole based upon the sensed parameters of the actual stroke of the real golf ball 22. In one implementation, processor 48 may present a graphic illustrating travel of the simulated golf ball or an animation of the simulated golf ball moving based on the sense parameters from the actual stroke of golf ball 22.

In one implementation, caddie system 20 allows a golfer to practice strokes and see results in a confined environment. For example, ball 22 may be positioned on a mat or other surface and struck against a wall or other ball impeding surface. Based upon data sensed by electronics 26 and received by portable electronic device 24, processor 48 may determine and present ultimate predicted values for the stroke. For example, in one implementation, processor 48 may predict and display a flight distance of the struck ball, allowing the golfer to see the estimated results of his or her stroke if he or she had been golfing on an actual golf course or striking the ball in an open practice environment even though the ball travel is stopped or impeded by the ball impeding surface. In other implementations, processor 48 may predict and display other estimated stroke results such as maximum loft of a stroke, travel distance or roll distance of the stroke, distance to true roll of the ball and the like.

Caddie system 20 may also record an output of a series of multiple strokes between the tee and the hole for comparison, allowing the golfer to compare different hole performances over time or strategies. For example, caddie system 20 may record an output for comparison comprising the percentage or number of greens made in regulation. Caddie system 20 may record an output for comparison comprising the percentage or number "up and in" or the percentage of number of double bogeys, bogeys, pars and birdies made from a particular location on the green, a particular location following a first or second shot off of the tea or from a hazard, such as a sand trap, along the green or along the fairway.

FIGS. 13 and 14 illustrate example outputs generated by processor 48 for allowing a golfer to visibly evaluate his or her progress or to identify areas for improvement. FIG. 13 illustrates output 360 comprising a bull's-eye display in which annular rings about the location of cup 202 are displayed, each ring representing a predefined range of distances from the cup 202. Output 360 indicates the range of distances in the percentage of the number of putts made from within the ring or zone. In other implementations, the number of putts may also be indicated.

FIG. 14 illustrates an output 370 comprising a heat map for strokes (putts) there were made from various locations on a green 371 for the particular hole location 372. Output 370 illustrates different zones 376-376F having similar statistics regarding the putts made from within the zone. The different zones may be represented by different colors or brightnesses indicating or keyed to different make-miss percentages. In contrast to the bull's-eye output 360, the heat zone output 376 results in a manner that additionally takes into account variations on the green such as a location of ridges, slopes and the like which are impacting the percentage of make-miss putts. Not only does such a heat map inform the golfer as to where he or she is proficient or where he or she needs improvement, but also serves as a guide, suggesting to the golfer where he or she should try to land or locate the golf ball on the green to maximize the likelihood of success for the following putt. Although the heat zones of output 370 illustrated with respect to different locations on a green, processor 48 may additionally or alternatively provide such heat zones for greens made in regulation from different locations on the golf course or for chips or pitches made or position within different predefined ranges of distances from the cup from different locations off the green.

FIG. 15 illustrates an example output 380 which may be presented by processor 48 on output 44 using the recorded stroke attributes. Output 380 visibly displays different putts from different locations on the green and the path of travel of the golf ball 22. Output 380 illustrate the lines of putts taken such that the golfer may visibly ascertain his or her performance when taking a more aggressive, more linear path to the cup as compared to a less aggressive, more curving path to the cup. Each previously recorded stroke has an initial starting position 386, a path 387 and a final ball location 388. Although output 380 is illustrated four putts from different locations on a green 381, output 380 may be similarly applied to other strokes taken from other locations off the green.

In addition to indicating progress or needs for improvement, the comparison of attributes of different strokes may also provide other useful information such as the relative green speed during a particular golf outing as compared to prior golf outings or the performance status or freshness of the golf ball being utilized. FIG. 16 illustrates an example method 400 which may be carried out by caddie system 20 to evaluate the current green speed. The caddie system 20 can also use the comparison of previous paths of travel of the golf ball 22 from previous shots on a green to a particular hole location as a tool for assisting the golfer in reading the green.

As indicated by step 402, electronic device 24 receives or acquires signals from sensor 28 of golf ball 22 during a first putt of golf ball 22 at a first time during a first session. As indicated by step 404, processor 48, following instructions contained a memory 52, determines one or more travel characteristics of the first putt.

As indicated by step 406, at a second later time are during a second golfing session, electronic device 24 receives or acquires signals from sensor 28 of golf ball 22 for a second putt. As indicated by step 408, processor 48, following instructions contained a memory 52, determines one or more travel characteristics of the second putt.

As indicated by step 410, processor 48 compares the determined travel characteristics of the first putt and the second putt. When comparing the travel characteristics, processor 48 takes into account differences in golf ball impact force that may have resulted in the first putt traveling a distance different than the distance of the second putt. In one implementation, processor 48 further utilizes position signals from golf ball 22 to identify a common segment of travel along the same portions of the green. By taking into account the differences impact force of the different putts and by reducing or eliminating the impact of elevation changes in the green, processor 48 identifies the differences in travel distance of the two putts which are substantially due to changes in green speed from the first session to the second session. Such differences are stored locally or remotely in a memory. As indicated by step 412, the differences in relative green speeds are further outputted for display. As a result, golfer may be apprised of changes in green speed that may occur due to the time of day, the time of year, rainy conditions or dry conditions. In one implementation, processor 48 may indicate that changes in relative terms such as by indicating that the green speed is 20% faster as compared to the last time the golfer played the course or the same hole. In one implementation, first and second putts can occur during the same first or second session.

In one implementation, processor 48 compares the travel characteristics of two different strokes (not necessarily putts) to determine the performance quality or freshness of the golf ball being used. The comparison of travel characteristics (or other sensed stroke parameters) may indicate a degradation of the golf ball. In one implementation, processor 48 may generate signals outputting a visible or audible indication on output 44 that the current ball should be replaced or indicating an estimated remaining useful life (time or number of impacts) for the golf ball. In one implementation, golf ball 22 may additionally be provided with an indicator, such as the light emitting diode or other structure which changes color, which turns on or were changes brightness based upon the determined remaining useful life, if any, of the golf ball based upon the comparison of stroke attributes by sensor 28. In some implementations, rather than the determination be made by processor 48 in electronic device 24, the determination of the remaining useful life of the golf ball may be made by an electronic circuit chip or processor located within or carried by golf ball 22. The determination of remaining life can be made off of or based upon one or more of a factors such as, for example, number of impacts of the golf balls, magnitude of the impacts, the age of the golf ball, the temperature conditions, moisture conditions, and combinations thereof.

In addition to assisting a golfer in improving his or her golf game with a particular club or set of clubs, caddie system 20 may additionally or alternatively assist in identifying recommended clubs or club characteristics for use by the golfer. Using data from ball 22, processor 48 may identify swing characteristics are putting characteristics of the golfer and utilize such information to recommend one or more particular clubs or changes in one or more clubs used by the golfer. For example, a golf professional, instructor or retail salesperson mask the golfer to putt golf ball 22 several times with one or more different golf clubs. During such putting, processor 48 receives data from golf ball 22. Utilizing data such as the rolling conditions of the ball (speed, launch, spin, flight, skid, roll), processor 48 identifies and displays one or more recommended putters or recommends attributes (shaft length, lie angle, face progression, shaft insertion location, center of gravity, moment of inertia, grip size, head characteristics, shaft flexibility/rigidity, weighting and the like) for a putter for the particular golfer. In other implementations, caddie system 20 may utilize data sensed from golf ball 22 to make recommendations regarding other types of clubs such as pitching wedges, sand wedges, flop wedges, hybrid clubs and woods.

Figure 17:
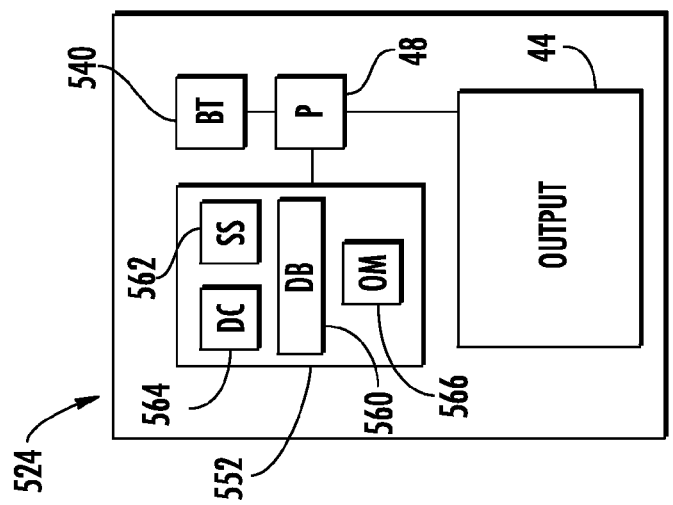

FIGS. 17-20 schematically illustrate other examples of portable electronic device 24 and golf ball caddie system 20. FIG. 17 schematically illustrates portable electronic device 524, a specific example of portable electronic device 24 to be used with golf ball 22. Portable electronic device 524 is similar to portable electronic device 24 except that portable electronic device 524 is specifically illustrated as comprising ball transceiver 540 in lieu of data acquisition device 40 and memory 552 in lieu of memory 52. Those remaining components of portable electronic device 524 which correspond to components of portable electronic device 24 are numbered similarly.

Ball transceiver 540 comprises a device to receive signals from signal transducer 30 of electronics 26. In one implementation, ball transceiver 540 further transmits signals to ball 22. In one implementation, ball transceiver 540 communicates with signal transmitter 30 of electronics 26 in a wireless fashion such as through radio frequency signals, optical or infrared signals and the like. In one implementation, ball transceiver 540 receives signals from golf ball 22 during entire cycle of the golf ball stroke. In another implementation, ball transceiver 540 receives signals from golf ball 22 during selected portions of the cycle of the golf ball stroke. For example, signal transmitter 30 may be activated and may start transmitting sensed stroke attributes in response to sensor 28 sensing a stroke attribute having a particular characteristic, triggering the output of stroke attributes by signal transmitter 30. In such a manner, battery power of golf ball 22 is conserved and processing loads placed upon processor 48 are reduced.

Memory 552 is similar to memory 52, but is specifically illustrated as comprising made database 560 of previously recorded stroke attributes, stroke determination module 562, results storage 564 and output module 566. Database 560 comprises a storage portion of memory 552 containing attributes for previous recorded strokes. Database 560 may be uploaded or imported from a remote source or, in other implementations, may be created using signals from golf ball 22 itself. As will be described hereafter, in some implementations, database 560 may comprise uploaded or imported sets of associated data created at other times by other golfers, such as golf instructors, golf professionals or a general population of golfers.

Stroke selection module 562 comprises that code or software in memory 552 which directs processor 48 to determine which previously recorded strokes and their associated attributes to recommend or present to the golfer for possible emulation. In one implementation, the determination of which previously recorded strokes to output is based at least in part upon a predefined zone of locations which include both the current ball position and the initial ball positions of the previously recorded strokes. In some implementations, other criteria may be used by stroke determination module for selecting one or more previously recorded strokes from database 560, such as whether the previously recorded stroke was a made putt, whether previously recorded stroke resulted in the ball landing on the green, whether the previously recorded stroke was with the club preferred by the golfer, whether the previously recorded stroke was made under similar environmental conditions and the like.

Data capture module 564 comprises software code for directing processor 48 to receive our capture data or signals for each stroke from sensor 28 of ball 22 via signal transmitter 30. Data capture module 564 stores the results or associated attributes for each stroke in database 560. As a result, database 560 contains sets of associated attributes for strokes made by the golfer as well as strokes made by other golfers. In other implementations, one or more separate databases may be maintained for storing the golfer's personal stroke results.

Output module 566 comprises code or software contained in memory 552 for instructing processor 48 in the output the selected previously recorded strokes as well as ongoing stroke results on output 44. As noted above, in one implementation, output module 566 directs processor 48 to present historical data regarding overall stroke percentages, individual stroke percentages from different locations on the golf course and instruction for improving stroke accuracy. In other implementations, output module 566 may generate different output based upon one or more determinations of whether one or more strokes are made holes.

Figure 18:
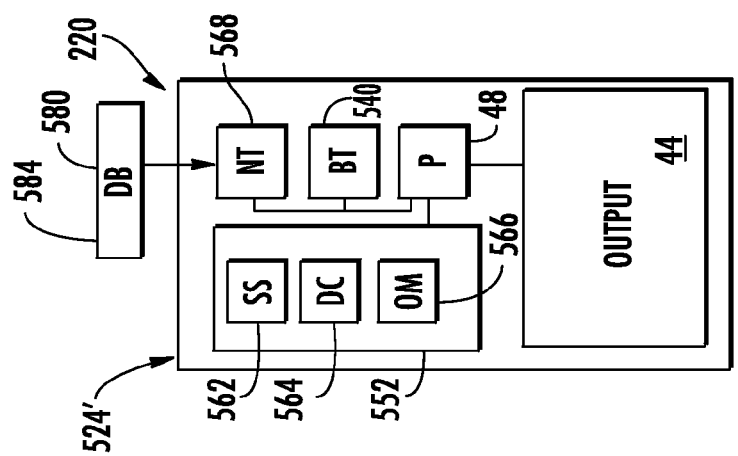

FIG. 18 schematically illustrates portable electronic device 524', another example implementation of portable electronic device 24. FIG. 18 illustrates portable electronic device 524' used as part of a golf ball caddie system 220 which utilizes golf ball 22 (shown described above with respect to system 20) and remote facilitators: database 580 and results storage 584. Portable electronic device 524' is similar to portable electronic device 524 except that portable electronic device 524' omits database 560 from memory 552 and additionally comprises network transceiver 568. Those remaining components of portable electronic device 524' which correspond to components of portable electronic device 524 are numbered similarly.

Network transceiver 568 comprises a device to communicate across a local area network (LAN) or a wide area network (WAN) such as the Internet. In one implementation, network transceiver 568 facilitates indirect communication with ball 22 via an intermediary, such as an intermediate server or cloud that communicates with both ball 22 and portable electronic device 524'. In one implementation, network transceiver 568 further facilitates the acquisition of data from remote data sources by portable electronic device 524 and facilitates the transmission of sensed stroke attributes and/or make/miss results to other remote locations across a LAN or WAN. In the example illustrated, network transceiver 568 facilitates remote storage of database 580 and database 560 for reducing memory consumption of portable electronic device 524'.

Database 580 is similar to database 560 except that database 580 is remotely stored with respect to portable electronic device 524'. In one implementation, database 580 is remotely stored on a network server or cloud server which is accessible by multiple different users having different portable electronic devices. As a result, database 580 facilitates use of a general set of database by multiple different users at multiple different locations, wherein the shared database 580 may be more frequently and economically adjusted or updated for a large number of users. In one implementation, database 580 may comprise multiple sets of associated data for different strokes by different golfers. For example, database 580 may comprise a first set of sets of data for strokes by different professional golfers and a second set of data for strokes by golf instructors.

Because database 580 is remote from portable electronic device 524 stroke results stored in database 580 are accessible through a network connection. As a result, database or a 580 enables other persons, such as golf instructors, to access shooting results across a wide area network. In some implementations, access may be provided to organizations offering rewards or incentives for stroke performance or for improvement or practice frequency. For example, in one implementation, a health insurance provider is provided access to database 580, wherein the health insurance provider provides rewards or incentives to ensure in based upon exercise frequency reflected in the data of database row 580. In another implementation, other users are also provided with access to results in database 580 across a network, allowing remote competitions or challenges.

Figure 19:
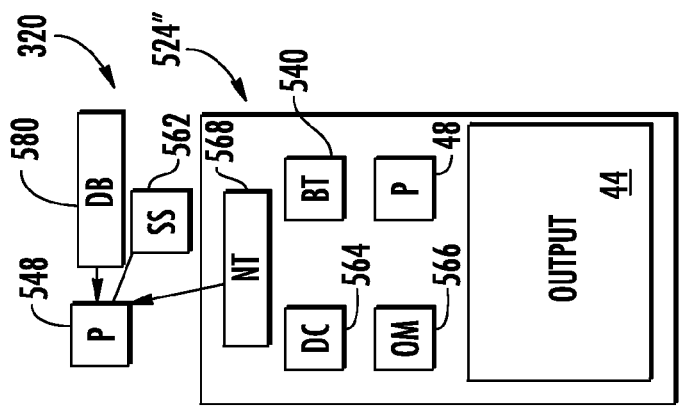
FIGS. 17 through 19 schematically illustrate portable electronic devices of the caddie system in accordance with alternative preferred embodiments of the present invention.

FIG. 19 schematically illustrates portable electronic device 524", another example implementation of portable electronic device 24. Portable electronic device 524" is illustrated as being utilizes part of a golf ball caddie system 20 which utilizes golf ball 22 (described above with respect to system 20) and remote facilitators: database 580, processing unit 548 and stroke selection module 562.

Portable electronic device 524" is similar to portable electronic device 524' except that portable electronic device 524" omits stroke determination module 562. Instead, the determination of whether a particular golf ball stroke is a made hole or miss hole is made by a remotely located processing unit 548 following instructions provided by remotely located stroke determination module 562. Stroke selection module 562 used by electronic device to 524" is similar to stroke determination module 562 electronic device 524' except that stroke determination module 562 used by the electronic device 524" is located remote with respect to portable electronic device 524". In one implementation, stroke selection module 562 and the associated processing unit 548 are located on a remotely located network server or cloud server. Because stroke selection is performed remote from portable electronic device 524", processing demands placed on portable electronic device 524" are reduced. In other implementations, portable electronic device 524" may additionally include stroke selection module 562, wherein a user may select whether stroke determinations are made locally by portable electronic device 524" (potentially faster response times, but greater consumption of memory and processing power locally on portable electronic device 524") or stroke determinations are made remotely by stroke determination module 562 and processor 548.

Figure 20:
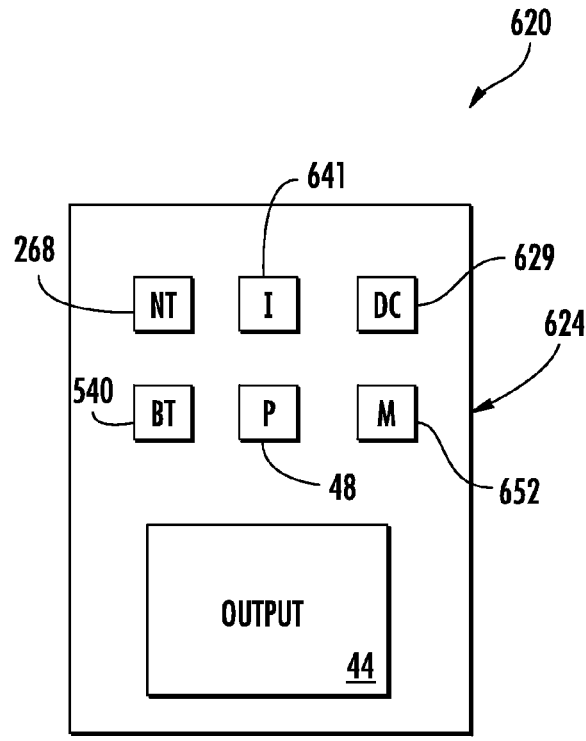
FIG. 20 schematically illustrates a golf ball caddie system in accordance with another alternative preferred embodiment of the present invention.

FIG. 20 schematically illustrates golf ball caddie system 620, another example implementation of golf ball caddie system 20 shown in FIG. 1. Golf ball caddie system 620 comprises golf ball 22 (shown and described with respect to golf ball caddie system 20 and FIG. 1) and portable electronic device 624. In some implementations, golf ball caddie system 620 additionally comprises intermediate facilitators: database 560, data capture module 564, remote processing unit 548 and/or stroke selection module 562.

Portable electronic device 624 is similar to portable electronic device 524 except that portable electronic device 624 is illustrated as specifically comprising data compressor 629, input 641, network transceiver 268 and memory 652. Those remaining components of portable electronic device 624 which correspond to components of portable electronic device 524, 524' or 524" are numbered similarly.

Data compressor 629 comprises a module to facilitate compression of data for transmission using network transceiver 268. Data compressor 629 may comprise a lossy or lossless data compression device. Data compressor 629 reduces bandwidth requirements for electronic device 624 when communicating sometimes large amounts of stroke data (raw, derived or results) across a network. In some implementations, data compressor 629 may be omitted.

Input 641 comprises one or more devices by which a person may enter data and/or selections or commands to portable electronic device 624. It should be understood that each of portable electronic devices 524, 524' and 524" in some implementations, likewise include input 641. Examples of input 641 include, but are not limited to, a keyboard, a keypad, a touchpad, a stylus, a microphone and associated speech recognition, a mouse and/or a touchscreen. In some implementations, input 641 may be incorporated as part of a display screen serving as output 44, wherein the display screen is a touch screen. Input 641 facilitates (1) the entry of data, such as data for establishing a hole and court coordinate system, data identifying the player and his or her personal information or data regarding characteristics of golf ball 22, and (2) the entry of commands or selections such as the entry of desired settings or options, display formats, thresholds, confirmations and the like.

Network transceiver 268 is described above with respect to portable electronic device 224. Network transceiver 268 facilitates communication across a network, such as a local area network or a wide area network (Internet). As noted above with respect to golf ball caddie systems 220 and 320, network transceiver 268 may facilitate remote storage of database 660, results 564 and/or the determination of whether a stroke is a made stroke or miss stroke using a remote processing unit 548 in conjunction with a remote determination module 562. In some implementations, network transceiver 268 may be omitted.

Figure 21:
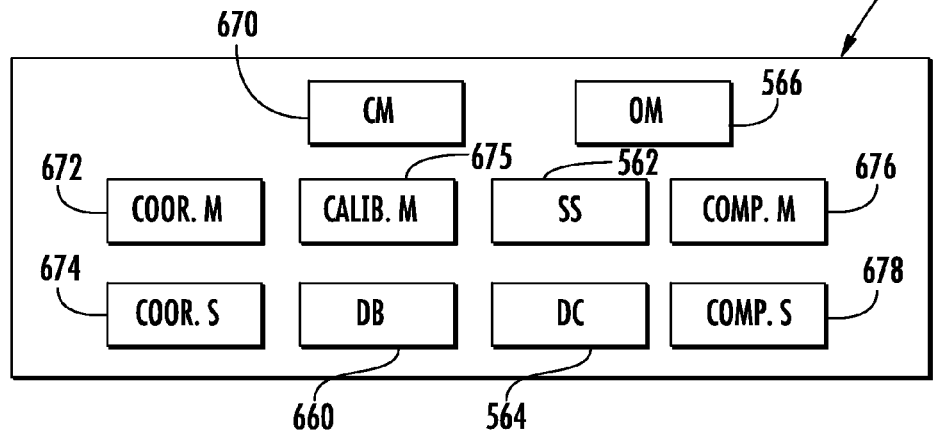
FIG. 21 schematically illustrates the memory of the golf ball caddie system of FIG. 20.

Memory 652 comprises a non-transient computer-readable medium containing code configured to direct the processing unit 48 to carry out one or more operations in the sensing of golf ball strokes. FIG. 21 illustrates memory 652 in more detail. As shown by FIG. 21, memory 652 comprises determination module 562, data capture module 564 and output module 566 described above. Memory 652 further comprises database 660, wherein database 660 comprises database 560 or variations thereof. As shown by FIG. 21, memory 652 further comprises communication module 670, coordinate module 672, coordinate storage 674, calibration module 675, comparison module 676 and comparison storage 678.

Communication module 670 comprises software code or programming that provide direct communication between portable electronic device 624 and golf ball 22 and/or a remote intermediary such as database 580, result storage 584 and/or processing unit 548 and the associated determination module 562 across a network using one or more servers.

Coordinate module 672 comprises software or code for directing processing unit 48 in the establishment of a hole coordinate system or grid layout. Coordinate module 672 directs processor 48 to provide instructions for establishing such a coordinate system using one or more prompts presented on output 44. Coordinate module 672 further instructs processor 48 to generate control signals which are transmitted to ball 22 through ball transceiver 540 of ball 22 in the establishment of the hole coordinate system. For example, coordinate module 672 may direct processor 48 to transmit control signals to golf ball 22 to instruct golf ball 22 in the RSS timestamp or other triangulation to establish a hole coordinate system. As noted above, in some implementations, coordinate module 672 may instead utilize sensors of portable electronic device 624 that correspond to sensors golf ball 22 when determining the hole coordination system, wherein the determine back coordination system is transmitted to golf ball 22 for subsequent use when transmitting launch coordinate. The determined hole coordinates are stored in coordinate storage 674.

Calibration module 675 comprise software or code for directing processor 48 in the calibration of golf ball caddie system 620 based upon specific environmental conditions such as green speed, wind speed and direction, humidity and the like. In one implementation, calibration module 675 adjusts settings or values in database 660 based upon such environmental conditions. In another implementation, calibration module 675 generator creates at least portions of database 660 based upon sensed stroke attributes of the golfer.

Figure 22:
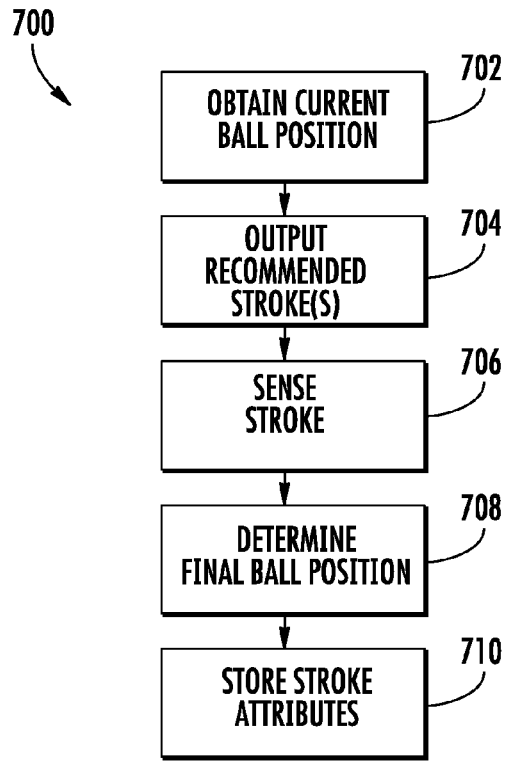
FIG. 22 is a flow diagram of an example calibration method of the golf ball caddie system.

FIG. 22 is a flow diagram of an example calibration method 700 that may be carried out by golf ball caddie system 620. As indicated by block or step 702, caddie system 620 obtains a current ball position. Coordinate module 672 establishes a coordinate system or obtains a coordinate system for a particular hole on a golf course. In one implementation, the coordinate system may be predetermined or maybe obtained from a remote source across a wired or wireless network. Coordinate storage model 674 stores the determined or received coordinate system for the hole.

As indicated by step 704, stroke selection module 562 directs processor 48 to utilize the obtained current ball position to select and recommend one or more previously recorded strokes stored in database 660. As noted above, stroke selection module 562 may use other factors when selecting previously recorded stroke and its attributes for output such as whether the previously recorded stroke was made using a club type preferred by the golfer, whether the previously recorded stroke resulted in a desired outcome (a made putt, a drive landing within the fairway, a pitch or drive landing on the green), whether the previously recorded stroke was made under similar environmental conditions and the like. As shown above in FIG. 8, the previous recorded stroke or strokes may be represented in various fashions to guide the golfer in the upcoming stroke.

As indicated by step 706, data capture module 564 directs processor 48 to sense one or more attributes of the stroke of the golf ball 22 by the golfer. As indicated by step 708, data capture module 564 further instructs processor 48 in the determination of the final ball position based upon signals from golf ball 22. Data capture module 564 directs processor 48 in the determination of whether the final ball position following a stroke is in the cup using such attributes as sensed vibration, acceleration, elevation and the like from signals received from sensor 28. As indicated by step 710, data capture module 564 directs processor 48 to store the attributes in database 660.

Comparison module 676 utilizes stored attributes for stroke tracking (described above with respect to FIGS. 3 and 4) or for stroke analysis (described above with respect to FIGS. 10-14). The results of such analysis may be stored in comparison storage 678. In one implementation, comparison module 676 may further direct processing unit 48 to compare results of one or more golf ball strokes with corresponding strokes of other players, with previously recorded results by the same person or player or with personal shooting goals of the person. In one implementation, the results of other players or the personal shooting goals of the person which are used for comparison are stored in comparison storage 678. In one implementation, the results of other players or personal shooting goals of the person may be retrieved from a remote storage sites such as from the other player's portable electronic device or a generally accessible intermediary such as a Web server. Once the comparison is made, comparison module 676 directs processor 48 to present the comparison results on output 44. As a result, comparison module 676 facilitates challenges and competitions amongst different players as well as feedback and motivation for achieving one's personal goals. For example, different golfers golfing at different times and even on different days may participate in competitions such as longest drive, longest made putt, closest to the pin and the like.

In one implementation, comparison storage 678 stores golfing results for elite or celebrity golf ball players. For purposes of this disclosure, a "celebrity" shall mean a person who has attained notoriety or an elite status for his or her performance in the sport. Examples of such celebrities include college and professional golf ball players. Although comparison module 676 may utilize comparison storage 678 serving as a celebrity storage for storing user data pertaining to travel of the ball, in other implementations, comparison module 676 may obtain driving or putting results or results from a remote location using transceiver 268. For example, celebrity golfing results or characteristics, such as drive distance, longest made putt, closest to the pin may be alternatively provided at a remote server which may be accessed across a local or wide area network.

Based upon signals received from sensor 28, comparison module 676 directs processor 48 to compare a person's results with that of a celebrity and to output and/or store the comparison results.

In some implementations, comparison module 676 may additionally provide comparisons of one or more selected stroke attributes. For example, in one implementation, comparison module 676 may not only compare the percentage of strokes made from a particular distance or from a particular location on the golf course, but may also compare stroke attributes such as statistics regarding the height or arc of such strokes, statistics regarding the amount of backspin placed on the ball by players during such strokes, statistics regarding the launch angle of strokes. In implementations where the comparison is made with respect to a celebrity golfer, the user of golf ball caddie system 620 may discover that a particular professional golfer may have a better stroke percentage due to the celebrity player having a greater loft or applying backspin within a particular range. The comparison results are also stored in comparison storage 678 for subsequent retrieval for subsequent comparisons.

Although the claims of the present disclosure are generally directed to a golf ball sensing apparatus, the present disclosure is additionally directed to the features set forth in the following definitions.

1. A golf ball sensing apparatus for use with a portable electronic device including a data acquisition device and a processing unit, and in association with a golf club and a cup, the apparatus comprising:

at least one golf ball;

at least one sensor carried by the golf ball, the sensor sensing at least one attribute of the golf ball; and a non-transitory computer-readable medium to direct the processing unit to:

identify the initiation of a first stroke of the golf ball by the golf club towards the cup;

obtain a first final location of the golf ball of the first stroke;

obtain the at least one attribute of the first stroke from the data acquisition device;

store a set of associated data comprising an estimated first initial location of the golf ball, the first final location of the golf ball and the at least one attribute of the first stroke;

obtain a second initial location of the golf ball prior to a subsequent second stroke of the golf ball towards the cup; and output at least portions of the stored set of associated data in response to the second initial location being within a predetermined zone of the first initial location.

2. The apparatus of definition 1, wherein the medium comprises instructions to direct the processing unit to obtain an indication as to whether the first final location of the ball is in the cup.

3. The apparatus of definition 2, wherein the medium comprises instructions to direct the processing unit to prompt a person to input the indication as to the final location of the ball is in the cup.

4. The apparatus of definition 2, wherein the medium comprises instructions to direct the processing unit to determine whether the first final location of the ball is in the cup by comparing the at least one attribute of the first stroke to one or more predetermined signature characteristics of a made hole and to store the determination of whether the stroke is a made hole as part of the stored association.

5. The apparatus of definition 4, wherein the at least one signature characteristic of the final location of the ball being within the cup comprises a sensed pattern of translational movement or rotation of the ball.

6. The apparatus of definition 5, wherein the medium comprises instructions to obtain a characteristic of entrance of the ball into the cup, the characteristics selected from a group of characteristics consisting of: (A) the ball rolling across a side of the cup and directly to a bottom of the cup; (B) the ball rolling across the side of the cup and against a back of the cup before reaching the bottom of the cup; or (C) the ball rolling at least partially along the side of the cup before reaching the bottom of the cup; and store the characteristic of entrance of the ball into the cup as part of the stored association.

7. The apparatus of definition 6, wherein the medium comprises instructions to direct the processing unit to determine the characteristic of entrance of the ball into the cup based upon a pattern of translational movement or rotation of the ball.

8. The apparatus of definition 4, wherein the at least one signature characteristic of the final location of the ball being within the cup comprises at least one sensed characteristic of the golf ball sensed by the at least one sensor during a period of time consisting of when the golf ball is impacting a bottom of the cup.

9. The apparatus of definition 4, wherein the at least one signature characteristic of the final location of the hole being within the cup comprises a sensed deceleration of the golf ball within the cup.

10. The apparatus of definition 1, wherein the medium comprises instructions to direct the processing unit to output a plurality of sets of associated data based upon the initial location of the golf ball of each stored set of associated data being within a predetermined zone containing the second initial location of the golf ball.

11. The apparatus of definition 10, wherein the predetermined zone is based upon one or more criteria selected from a group of criteria's comprising a radius extending from the second initial location and an angular pie-shaped sector originating at the cup and containing the second initial location.

12. The apparatus of definition 10, wherein the predetermined zone is a non-concentric area about the second initial location, the non-concentric area comprising initial golf ball locations having at least one topographic surface condition within a predetermined range of the at least one surface condition of the second initial ball location.

13. The apparatus of definition 12, wherein the at least one surface condition comprises a terrain slope relative to second initial ball location.

14. The apparatus of definition 10, wherein the plurality of sets of associated data output comprise a predetermined number of sets of associated data having a final location of the golf ball that is left of the cup, right of the cup, in front of the cup, behind the cup and in the cup.

15. The apparatus of definition 1, wherein the at least one attribute of the stroke of the golf ball comprises an attribute selected from a group of attributes consisting of: spin of the golf ball, club impact location upon the golf ball; club impact force upon the golf ball; travel direction of the golf ball; initial velocity of the golf ball, launch angle of the golf ball.

16. The apparatus of definition 1, wherein the portable electronic device further includes an output device, wherein the medium comprises instructions for directing the processing unit to present a graphical representation on the output device, and wherein the graphical representation comprises a diagram of a green and stroke results from different locations on the green.

17. The apparatus of definition 16, wherein the graphical representation comprises a heat map of made putts from initial ball locations on the green.

18. The apparatus of definition 16, wherein the graphical representation further comprises an indication of a number of stroke attempts from different initial locations of the golf ball.

19. The apparatus of definition 16, wherein the graphical representation comprises a heat map of strokes indicating a percentage of made putts from on the green.

20. The apparatus of definition 16, wherein the graphical representation comprises a heat map of strokes indicating a percentage of landed greens from strokes of the golf ball initiated from off the green.

21. The apparatus of definition 1 wherein the portable electronic device further includes an output device, wherein the medium comprises instructions for directing the processing unit to present a statistical comparison on the output device indicating differences of stroke attributes for made and missed putts.

22. The apparatus of definition 1, wherein the initial location of the ball is off a green containing the cup and wherein the medium comprise instructions to direct the processing unit to obtain an indication as to whether the final location of the ball is on the green containing the cup.

23. The apparatus of definition 22, wherein the medium comprises instructions to direct the processing unit to determine whether the final location of the ball is on the green by comparing the at least one attribute of the stroke to one or more predetermined signature characteristics of the golf ball being on the green and to store the determination of whether the final location of the golf ball is on the green as part of the stored association.

24. The apparatus of definition 23, wherein the at least one signature characteristic of the final location of the golf ball being with on the green comprises a sensed landing impact of the golf ball.

25. The apparatus of definition 1 further comprising an output device, wherein the medium comprises instructions for directing the processing unit to present a graphical representation on the output device, the graphical representation comprising a diagram of a green and result percentages of the golf ball landing on the green from different locations off the green.

26. The apparatus of definition 1 further comprising an output device, wherein the medium comprises instructions for directing the processing unit to present a graphical representation on the output device, the graphical representation comprising a diagram of a green, and area off the green and result percentages from different locations off the green.

27. The apparatus of definition 31, wherein the graphical representation comprises a heat map of made greens from initial ball locations off the green.

28. The apparatus of definition 1, wherein the first final location and the second initial location are different locations.

29. An apparatus comprising:
a golf ball carrying a sensor; and
an indicator in communication with the sensor to output a notification pertaining to a freshness status of the golf ball based on signals from the sensor.

30. The apparatus of definition 29, wherein indicator is carried by the golf ball.

31. The apparatus of definition 31, wherein the indicator changes color and/or brightness based upon a freshness status determined based upon signals from the sensor.

32. The apparatus of definition 1, the portable electronic device is configured to detect a number of impacts upon the ball based upon the parameters.

33. The apparatus of definition 1 further comprising internal electronics configured to determine a number of impacts upon the ball based upon parameters sensed by the sensor.

34. The apparatus of definition 1, wherein the portable electronic device is configured to indicate a plurality recommended putt options for a current ball position on a green, each option comprising at least one of a different putt vector and putt force based upon a detected green speed for a current session and a current ball position relative to a cup on the green.

35. The apparatus of definition 34, wherein the portable electronic device is configured to determine the current ball position based upon the sensor and are configured to retrieve a current hole position on the green and topography of the green from an external database, wherein the external electronics are configured to output a plurality recommended putt options for the current ball position based upon the retrieved ball position and the retrieved topography.

36. The apparatus of definition 1, wherein the portable electronic device is configured to determine the current ball position based upon the sensor and is configured to retrieve a current hole position on the green and topography of the green, wherein the external electronics are configured to output a recommended putt option for the current ball position based upon the retrieved ball position and the retrieved topography, the putt option indicating a putting vector and a putting force, wherein the putting force is indicated in terms relative to a sensed putting force of a prior putt.

37. The apparatus of definition 1, wherein the sensor forms an inertial measurement unit comprising a combination of accelerometers, gyros an magnetometers.

38. The apparatus of definition 34, wherein the sensor forms an inertial navigation unit comprising a combination of accelerometers, gyros, magnetometers and global positioning system sensors.

39. A method comprising:
receiving signals from a sensor within a golf ball;
determining a number of strokes of the golf ball based upon the signals;
determining an initial position and final position of the golf ball for each stroke based upon the signals;
determining if the final position of a stroke is in a cup on a green;
displaying tracking of strokes of the golf ball to the cup on the green.

40. A method comprising:
receiving signals from a sensor within a golf ball indicating a position of the golf ball;
selecting, from a database of stroke recommendations for different positions of a golf ball, at least one stroke recommendation for the golf ball at the position based upon the indicated position of the golf ball;
transmitting the selected at least one stroke recommendation for display.

41. A method comprising:
receiving signals from a sensor with a golf ball during a first putt of the golf ball from a ball position zone at a first session;
determining a first travel characteristic of the first putt;
receiving signals from the sensor with the golf ball during a second putt of the golf ball from the ball position zone at a second session;
determining a second travel characteristic of the second putt;
comparing the first travel characteristic to the second travel characteristic based upon different sensed parameters of the first putt and the second putt to determine a relative green speed; and
transmitting signals indicating the relative green speed for display.

42. A method comprising:
obtaining at least one attribute of a first stroke of a golf ball, the at least one attribute being based upon signals received from at least one sensor carried by the golf ball;
storing the at least one attribute;
obtaining the at least one attribute of a second golf stroke of the golf ball;
outputting a comparison of the least one attribute of the first stroke and the second stroke.

43. An apparatus comprising:
a database of stored sets of associated data pertaining to previously recorded strokes of a golf ball, each set comprising data taken during moments of travel of the golf ball along a travel path;
a processing unit to:
obtain an initial location of a second golf ball;
generate a recommended stroke based upon the initial location of the second golf ball and selected portions of one or more individual stored sets of associated data taken during moments of travel from the golf ball along a less than whole portion of the travel path of each of the previously recorded strokes.

44. An apparatus comprising:
a database of stored sets of associated data pertaining to previously recorded strokes of a golf ball, each set comprising data taken during moments of travel of the golf ball along a travel path;
a processing unit to:
obtain an initial location of a second golf ball;
differently weight the associated data pertaining to the previously recorded strokes of the golf ball based upon the relative location of the golf ball at the moment the data was taken to the initial location of the second golf ball;
generate a recommended stroke based upon the initial location of the second golf ball and the differently weighted data pertaining to the previously recorded strokes.

45. An apparatus comprising:
a data acquisition device to obtain at least one attribute of a stroke of a golf ball, the at least one attribute being sensed by at least one sensor carried by the golf ball or derived from signal output by the at least one sensor;
a processing unit;
a memory containing instructions to direct the processing unit to:
identify and display a recommended golf club and/or recommended attributes for a golf club based upon the at least one attribute of the stroke of the golf ball.

46. The apparatus of definition 103, wherein the golf club comprises a putter.

47. A method comprising:
determining, with a processor, when a golf ball has been received within a cup based upon signals received from the golf ball; and
determining, with the processor, after the ball has been received within the cup, an initial location of the golf ball relative to the cup based upon signals received from the golf ball.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. An apparatus comprising:
a golf ball comprising:
an internal sensor comprising an accelerometer; and
an internal wireless communicator to communicate parameters sensed by the sensor to external electronics; and
a remote computing device comprising the external electronics, wherein the external electronics are configured to:
determine if the golf ball went into a cup based upon the parameters;
determine a first travel characteristic of a first putt of the golf ball from a ball position zone at a first session by comparing values of signals received from the accelerometer of the internal sensor of the golf ball;
determine a second travel characteristic of a second putt of the ball from the ball position zone at a second session by comparing values of signals received from the accelerometer of the internal sensor of the golf ball;
compare the first travel characteristic to the second travel characteristic based upon different sensed parameters of the first putt and the second putt to determine a relative green speed; and
indicate a recommended putt vector and putt force based upon the determined relative green speed.

2. The apparatus of claim 1, wherein the remote computing device comprises a display and is configured to present a simulated green, a simulated hole position and a simulated ball position, wherein the cup comprises a simulated cup at the simulated hole position and wherein the external electronics are configured to determine if the golf ball went into the simulated cup on the simulated green from the simulated ball position based upon the parameters.

3. The apparatus of claim 2, wherein the simulated green, simulated hole position and the simulated ball position based upon a prior putt on a real green, to a real hole position from a real ball position, the simulated ball position being within a predefined zone on the green containing the real ball position.

4. The apparatus of claim 1, wherein the external electronics are configured to determine and audibly or visibly indicate a degree to which the ball achieves a predetermined characteristic from a strike of the ball to a no slip rolling condition.

5. The apparatus of claim 4, wherein the predetermined characteristic comprises time or distance.

6. The apparatus of claim 1, wherein the external electronics are configured to determine a three-dimensional trajectory of the ball in terms of break and curvature of a putt and a putt distance for the golf ball based on the parameters.

7. The apparatus of claim 1, wherein the external electronics are configured to determine initial launch conditions of the golf ball in terms of a numerical value for each of initial velocity, spin and launch angle of the golf ball during a chip or pitch.

8. The apparatus of claim 1, wherein the external electronics are configured to concurrently pair to and communicate with a plurality of golf balls.

9. The apparatus of claim 1, wherein the external electronics are configured to determine, display and store a putt line based upon the parameters sensed by the sensor.

10. The apparatus of claim 9, wherein the external electronics are configured to group putts into groups based upon their associated stored putt line.

11. The apparatus of claim 1, wherein the external electronics are configured to:
store putting results from a zone of ball positions on a green during a first session, wherein the green may comprise a plurality of different zones and wherein the zone is one of the plurality of different zones;
differentiate stored putting results from an earlier session based upon whether the stored putting results are for putts originating inside the zone or outside the zone; and
display a statistical comparison of the stored putting results from the zone during the first session with stored putting results from the zone during an earlier session.

12. The apparatus of claim 11, wherein the zone comprises an annular ring about a cup on the green.

13. The apparatus of claim 11, wherein the zone comprises the region of the green having a predetermined elevation range with respect to an elevation of the cup.

14. The apparatus of claim 11, wherein the putting results are based upon the number of putts moving the golf ball from a ball position within the zone into the cup.

15. The apparatus of claim 11, wherein the external electronics are configured to store putting results from a plurality of different zones and ball positions on the green and to display statistical comparison of the results from the different zones.

16. The apparatus of claim 15, wherein the zone comprises an annular ring about a cup on the green.

17. The apparatus of claim 1, wherein the external electronics are configured to
indicate, visibly or audibly, the relative green speed of the second session relative to the first session.

18. The apparatus of claim 1, wherein the external electronics are configured to indicate a plurality recommended putt options for a current ball position on a green, each option comprising at least one of a different putt vector and putt force based upon the determined green speed for a current session and a current ball position relative to a cup on the green.

19. The apparatus of claim 1, wherein the external electronics further include an output device, wherein the external electronics present a graphical representation on the output device, and wherein the graphical representation comprises a diagram of a green and stroke results from different locations on the green.

20. The apparatus of claim 19, wherein the graphical representation comprises a heat map of made putts from initial ball locations on the green.

21. The apparatus of claim 19, wherein the graphical representation further comprises an indication of a number of stroke attempts from different initial locations of the golf ball.

22. The apparatus of claim 19, wherein the graphical representation comprises a heat map of strokes indicating a percentage of made putts from on the green.

23. The apparatus of claim 19, wherein the graphical representation comprises a heat map of strokes indicating a percentage of landed greens from strokes of the golf ball initiated from off the green.

24. The apparatus of claim 1, wherein the external electronics are configured to determine if the golf ball went into the cup based upon a sensed pattern of translational movement or rotation of the ball.

25. The apparatus of claim 1, wherein the external electronics are configured to determine a characteristic of entrance of the ball into the cup, the characteristics selected from a group of characteristics consisting of: (A) the ball rolling across a side of the cup and directly to a bottom of the cup; (B) the ball rolling across the side of the cup and against a back of the cup before reaching the bottom of the cup; or (C) the ball rolling at least partially along the side of the cup before reaching the bottom of the cup based upon the pattern of translational movement or rotation of the ball; and
store the characteristic of entrance of the ball into the cup.

26. An apparatus comprising:
a golf ball comprising:
an internal sensor comprising an accelerometer; and
an internal wireless communicator to communicate parameters sensed by the sensor to external electronics, wherein the external electronics are configured to determine if the golf ball went into a cup based upon the parameters, wherein the at least one sensor carried by the golf ball comprises an accelerometer and wherein the external electronics are configured to distinguish between different entry characteristics of the ball into a cup based upon signals from the accelerometer and to store each determined different entry characteristic for each putt, the different entry characteristics selected from a group of characteristics consisting of: (A) the ball rolling across a side of the cup and directly to a bottom of the cup; (B) the ball rolling across the side of the cup and against a back of the cup before reaching the bottom of the cup; or (C) the ball rolling at least partially along the side of the cup before reaching the bottom of the cup.

27. An apparatus comprising:
a golf ball carrying a sensor; and
an indicator in communication with the sensor to output a notification pertaining to a freshness status of the golf ball based on signals from the sensor.

28. The apparatus of claim 27, wherein indicator is carried by the golf ball.

29. The apparatus of claim 27, wherein the indicator changes color and/or brightness based upon a freshness status determined based upon signals from the sensor.

* * * * *